(12) United States Patent
Yamaguchi

(10) Patent No.: US 11,064,079 B2
(45) Date of Patent: Jul. 13, 2021

(54) IMAGE FORMING APPARATUS, METHOD OF CONTROLLING IMAGE FORMING APPARATUS, AND RECORDING MEDIUM

(71) Applicant: Konica Minolta, Inc., Tokyo (JP)

(72) Inventor: Tomohiro Yamaguchi, Shinshiro (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/810,292

(22) Filed: Mar. 5, 2020

(65) Prior Publication Data

US 2020/0304656 A1    Sep. 24, 2020

(30) Foreign Application Priority Data

Mar. 18, 2019    (JP) .............................. JP2019-049471

(51) Int. Cl.
*H04N 1/00*        (2006.01)
*H04R 29/00*       (2006.01)
*G10L 25/84*       (2013.01)
*G10L 25/51*       (2013.01)
*G10L 15/22*       (2006.01)

(52) U.S. Cl.
CPC ......... *H04N 1/00403* (2013.01); *G10L 15/22* (2013.01); *G10L 25/51* (2013.01); *G10L 25/84* (2013.01); *H04N 1/00925* (2013.01); *H04N 1/00957* (2013.01); *H04N 1/00976* (2013.01); *H04R 29/004* (2013.01)

(58) Field of Classification Search
CPC ........... H04N 1/00403; H04N 1/00925; H04N 1/00957; H04N 1/00976; G10L 15/22; G10L 25/51; G10L 25/84; H04R 29/004
See application file for complete search history.

(56) References Cited

U.S. PATENT DOCUMENTS

2016/0051067 A1\* 2/2016 Law ........................ A47F 9/046
                                                361/679.22
2019/0066684 A1\* 2/2019 Dozen ..................... G06F 3/167

FOREIGN PATENT DOCUMENTS

JP        2005-123700 A        5/2005

\* cited by examiner

*Primary Examiner* — Iriana Cruz
(74) *Attorney, Agent, or Firm* — Osha Bergman Watanabe & Burton LLP

(57) ABSTRACT

An image forming apparatus includes: a microphone that detects a voice; an executing device that executes a job; and a hardware processor that controls switching of a position of voice detection by the microphone, depending on the job.

19 Claims, 25 Drawing Sheets

*FIG. 5*

| TYPE OF CONNECTION APPARATUS | TYPE OF JOB | LOCATION OF NOISE GENERATION SOURCE | DESTINATION OF MICROPHONE |
|---|---|---|---|
| NO CONNECTION APPARATUS | ONE-SIDE PRINTING | P1 | Q1 |
| | TWO-SIDE PRINTING | P2 | Q2 |
| | SCAN | P3 | Q3 |
| | ⋮ | ⋮ | ⋮ |
| SHEET CONTAINER DEVICE 400 | ONE-SIDE PRINTING | P4 | Q4 |
| | TWO-SIDE PRINTING | P5 | Q5 |
| | SCAN | P6 | Q6 |
| | ⋮ | ⋮ | ⋮ |
| POST-PROCESSING DEVICE 500 | ONE-SIDE PRINTING | P7 | Q7 |
| | TWO-SIDE PRINTING | P8 | Q8 |
| | SCAN | P9 | Q9 |
| | ⋮ | ⋮ | ⋮ |
| SHEET CONTAINER DEVICE 400 +POST-PROCESSING DEVICE 500 | ONE-SIDE PRINTING | P10 | Q10 |
| | TWO-SIDE PRINTING | P11 | Q11 |
| | SCAN | P12 | Q12 |
| | ⋮ | ⋮ | ⋮ |

212

IMAGE FORMING APPARATUS, METHOD OF CONTROLLING IMAGE FORMING APPARATUS, AND RECORDING MEDIUM

CROSS-REFERENCE TO RELATED APPLICATION

The entire disclosure of Japanese patent Application No. 2019-049471, filed on Mar. 18, 2019, is incorporated herein by reference.

BACKGROUND

Technical Field

The present invention relates to an image forming apparatus, a method of controlling an image forming apparatus, and a recording medium storing a program for controlling an image forming apparatus.

Description of the Related Art

As the voice recognition technology has developed in recent years, there are a large number of electronic apparatuses that can be operated in accordance with instructions issued by voice. The voice recognition technology is also adopted in image forming apparatuses. Normally, noise collected separately from voice affects the accuracy of voice recognition. For this reason, a device for preventing the influence of noise during voice recognition is provided even in a conventional image forming apparatus. For example, JP 2005-123700 A suggests an image forming apparatus in which a microphone is installed at a position at a predetermined distance from an automatic document conveyance mechanism that is a source of noise generation.

The technology disclosed in JP 2005-123700 A can cope with noise generated from the automatic document conveyance mechanism, but cannot adequately cope with noise generated from some other location. Normally, the source of noise generation may vary depending on the type of the job being executed in the image forming apparatus. The technology disclosed in JP 2005-123700 A is not capable of coping with such variation.

SUMMARY

One or more embodiments of the present invention provide an image forming apparatus that has a microphone and is capable of preventing the microphone from detecting noise in addition to a voice even in a case where the source of noise generation varies with job types. One or more embodiments of the present invention provide a method of controlling the image forming apparatus, and a program storing a program for controlling the image forming apparatus.

According to one or more embodiments of the present invention, an image forming apparatus comprises: a microphone that detects a voice; an executor (or executing device) that executes a job; and a hardware processor that performs switching control for switching a position of voice detection to be performed by the microphone, depending on the job.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram showing an example of associated information according to one or more embodiments;

DETAILED DESCRIPTION OF EMBODIMENTS

Figure 1:
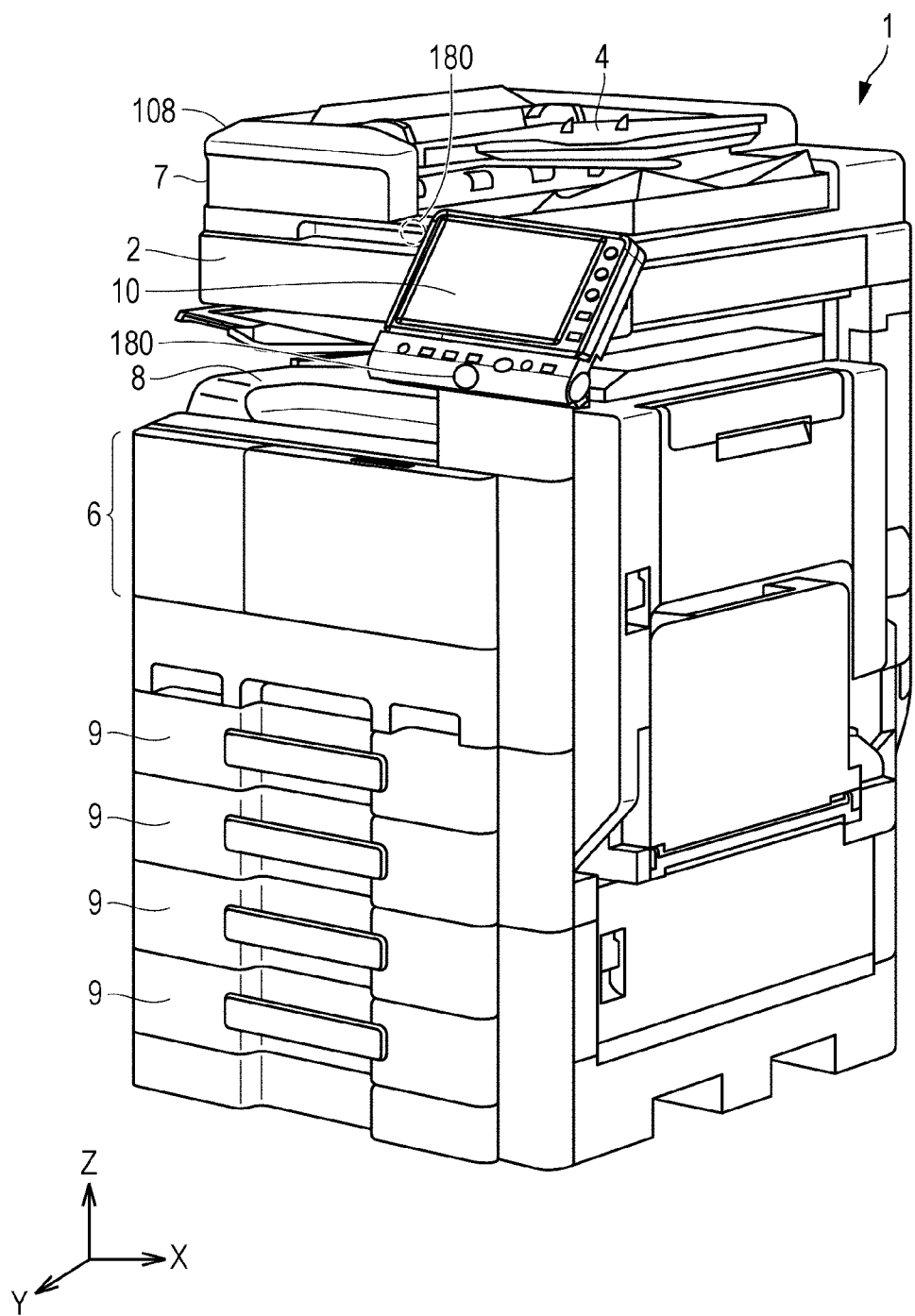
FIG. 1 is a diagram showing the configuration of an entire image forming apparatus according to one or more embodiments.

Hereinafter, embodiments of the present invention will be described with reference to the drawings. However, the scope of the invention is not limited to the disclosed embodiments. In the description below, like components are denoted by like reference numerals. Like components also have like names and functions. Therefore, detailed explanation of them will not be repeated.

<A. Configuration of an Entire Image Forming Apparatus 1>

FIG. 1 is a diagram showing the configuration of an entire image forming apparatus 1 according to one or more embodiments. FIG. 1 illustrates, as a typical example of the image forming apparatus 1, a multifunction peripheral (MFP) equipped with a plurality of functions such as a scanner function, a copy function, a facsimile function, a network function, and a BOX function.

The image forming apparatus 1 according to one or more embodiments includes a scanner 2 that optically reads a document and obtains image data, and a print engine 6 that prints an image on a recording medium in accordance with image data. Examples of the recording medium include plain paper, high-quality paper, art paper, coated paper, Japanese paper, postcard paper, and transparent film. Hereinafter, the recording medium will be described as a "paper sheet".

The horizontal direction (width direction) of the image forming apparatus 1 as viewed from a user standing in front of the image forming apparatus 1 is defined as the X-axis direction. The depth direction of the image forming apparatus 1 as viewed from a user standing in front of the image forming apparatus 1 is defined as the Y-axis direction. The height direction of the image forming apparatus 1 as viewed from a user standing in front of the image forming apparatus 1 is defined as the Z-axis direction.

The rightward direction as viewed from a user standing in front of the image forming apparatus 1 is defined as the positive direction of the X-axis direction. The leftward direction as viewed from a user standing in front of the image forming apparatus 1 is defined as the negative direction of the X-axis direction. The frontward direction as viewed from a user standing in front of the image forming apparatus 1 is defined as the positive direction of the Y-axis direction. The backward direction as viewed from a user standing in front of the image forming apparatus 1 is defined as the negative direction of the Y-axis direction. The upward direction as viewed from a user standing in front of the image forming apparatus 1 is defined as the positive direction of the Z-axis direction. The downward direction as viewed from a user standing in front of the image forming apparatus 1 is defined as the negative direction of the Z-axis direction.

On the upper surface of the main frame of the image forming apparatus 1, a feeder 4 that sends a document to the scanner 2 is disposed. In the image forming apparatus 1, a document holddown device 108 including a feeder 4 is disposed. The document holddown device 108 can be opened and closed by the user. In normal times, the document holddown device 108 is in a closed state. In a case where the user sets a document on the image forming apparatus 1, the user opens the document holddown device 108, and places the document on the placement surface (the placement surface 182 shown in FIG. 17B), to set the document on the image forming apparatus 1. After that, the user closes the document holddown device 108, with the document remaining on the placement surface.

In a lower portion of the image forming apparatus 1, a plurality of sheet feeder units 9 that supply paper sheets to the print engine 6 is disposed. Further, a tray 8 onto which paper sheets having images formed thereon by the print engine 6 are ejected is disposed in a central portion of the image forming apparatus 1.

An operation panel device 10 having a display surface is mounted on the front side (the side the user faces) of the upper surface of the main frame of the image forming apparatus 1. The operation panel device 10 corresponds to the "display" of one or more embodiments of the present invention. The operation panel device 10 is a device for operating the image forming apparatus 1. The image forming apparatus 1 also includes a drive mechanism (not shown) for the use to drive (move) the operation panel device 10. The drive mechanism includes a mechanism that enables the operation panel device 10 to be driven (moved) in the X-axis direction, the Y-axis direction, and the Z-axis direction, and a mechanism that enables the operation panel device 10 to rotate.

Figure 2:
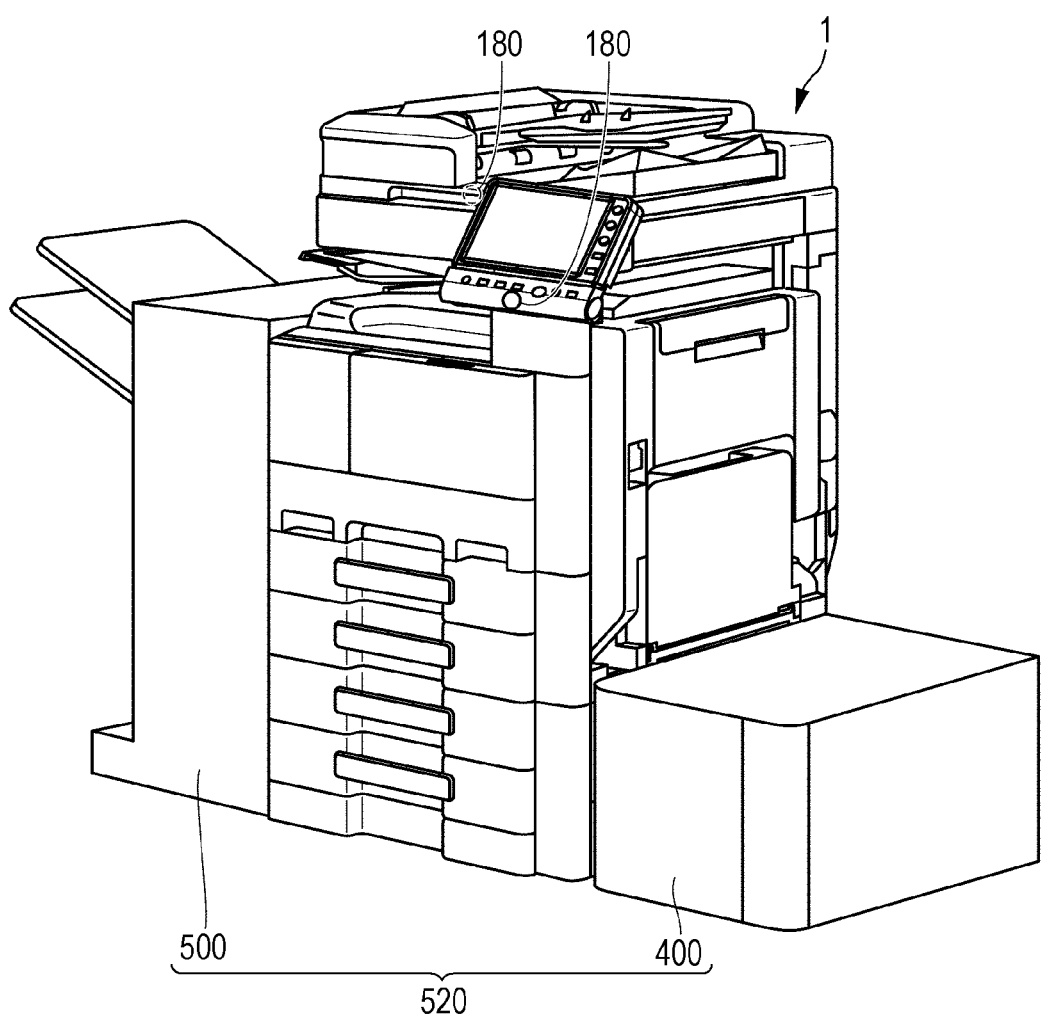
FIG. 2 is a diagram showing the configuration of the entire image forming apparatus to which a connection apparatus is connected, according to one or more embodiments.

In one or more embodiments, a connection apparatus can be connected to the image forming apparatus 1. FIG. 2 is a diagram showing the configuration of the entire image forming apparatus 1 to which a connection apparatus is connected. In the example illustrated in FIG. 2, a connection apparatus 520 includes a sheet container device 400 and a post-processing device 500. The sheet container device 400 is a device that can store a large number of paper sheets, and convey the stored paper sheets to the image forming apparatus 1. The post-processing device 500 performs post-processing on a paper sheet after printing, for example. The post-processing includes finisher processing, for example. The connection apparatus 520 is not necessarily the sheet container device 400 and the post-processing device 500, and may be some other devices. As described above, the image forming apparatus 1 of one or more embodiments can achieve various functions, as the connection apparatus 520 is connected to the image forming apparatus 1.

<B. Hardware Configuration of the Image Forming Apparatus>

Figure 3:
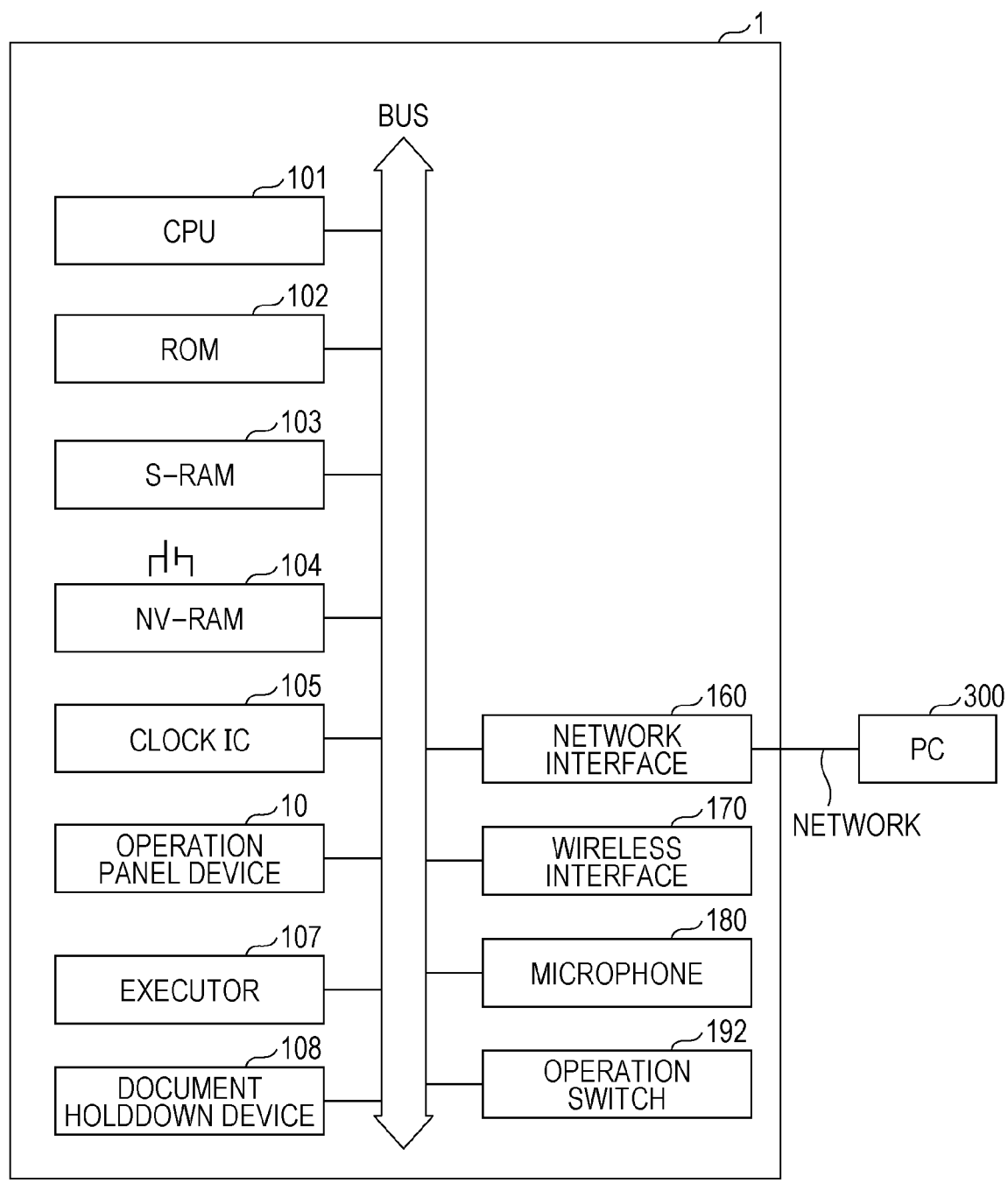
FIG. 3 is a block diagram showing the hardware configuration of the image forming apparatus according to one or more embodiments.

FIG. 3 is a block diagram showing the hardware configuration of the image forming apparatus 1. As shown in FIG. 3, the image forming apparatus 1 includes a hardware processor or central processing unit (CPU) 101, a read only memory (ROM) 102 in which a control program is stored, a working static random access memory (S-RAM) 103, a battery-backed non-volatile RAM (NV-RAM: a non-volatile memory) 104 that stores various kinds of settings relating to image formation, a clock integrated circuit (IC) 105, an operation panel device 10, a document holddown device 108, a network interface 160, a wireless interface 170, a microphone 180, and an operation switch 192. The respective components described with reference to FIG. 3 are connected via a bus.

The CPU 101 executes an operating program stored in the ROM 102 or the like, to comprehensively control the entire image forming apparatus 1. Particularly, the image forming apparatus 1 of one or more embodiments can perform various kinds of operations, using voices uttered by the user. Therefore, the CPU 101 can perform a voice recognition process for detecting voices of the user with the microphone 180 and recognizing the detected voices as various kinds of operation commands.

The ROM 102 stores programs to be executed by the CPU 101, and other data and tables.

The S-RAM 103 serves as a work area when the CPU 101 executes a program, and temporarily stores the program, the data, and the like when the program is executed.

The NV-RAM 104 is a non-volatile memory backed up by a battery, and stores various kinds of settings relating to image formation.

The clock IC 105 measures time, and functions as an internal timer to measure processing time or the like.

The operation panel device 10 displays various kinds of information. For example, the operation panel device 10 displays a copy button (the button for causing an executor 107 to perform an image formation process), a scan button (the button for causing the executor 107 to perform a scan process), and the like. In one or more embodiments, the microphone 180 is disposed on the operation panel device 10.

The operation panel device 10 can be driven (moved) by the user. For example, the operation panel device 10 is slidable (see FIGS. 7A and 7B). As the operation panel device 10 can be driven in this manner, the operation panel device 10 is also referred to as a "movable device".

By inputting a command from the operation panel device 10, the user can cause the executor 107 to execute the job corresponding to the command. By uttering a voice to the microphone 180, the user can also cause the image forming apparatus 1 to execute the job specified by the voice.

Here, a job is an instruction to be input to the image forming apparatus 1, and is the processing contents to be executed by the image forming apparatus 1 in accordance with the instruction. Specific job contents differ depending on the contents of instructions input by the user. Examples of jobs of one or more embodiments includes an image forming job, a scan job, and a facsimile job. That is, the executor (or executing device) 107 includes an image forming unit, a scan process executor, and a facsimile process executor. In other words, the image forming unit, the scan process executor, the facsimile process executor, and the like are collectively referred to as the executor 107. The image forming unit performs an image formation process, and includes a photosensitive member, an exposure device, and a developing device, for example. In the image forming apparatus 1 of one or more embodiments, the document holddown device 108 holds down the document the user has placed on the placement surface. The document holddown device 108 can also be opened and closed by the user.

The network interface 160 transmits and receives various kinds of information to and from external devices such as a personal computer (PC) 300 and another image forming apparatus (not shown) connected to the image forming apparatus 1 via a network.

The wireless interface 170 transmits and receives information to and from other devices via wireless signals. The microphone 180 detects a voice uttered by the user.

The operation switch 192 is a different switch from the switches displayed on the operation panel device 10, and is a switch having a physical contact, for example. The user can also input a command to the image forming apparatus 1 by operating the operation switch 192.

<C. Example Functional Configuration of a Control Device 200>

Figure 4:
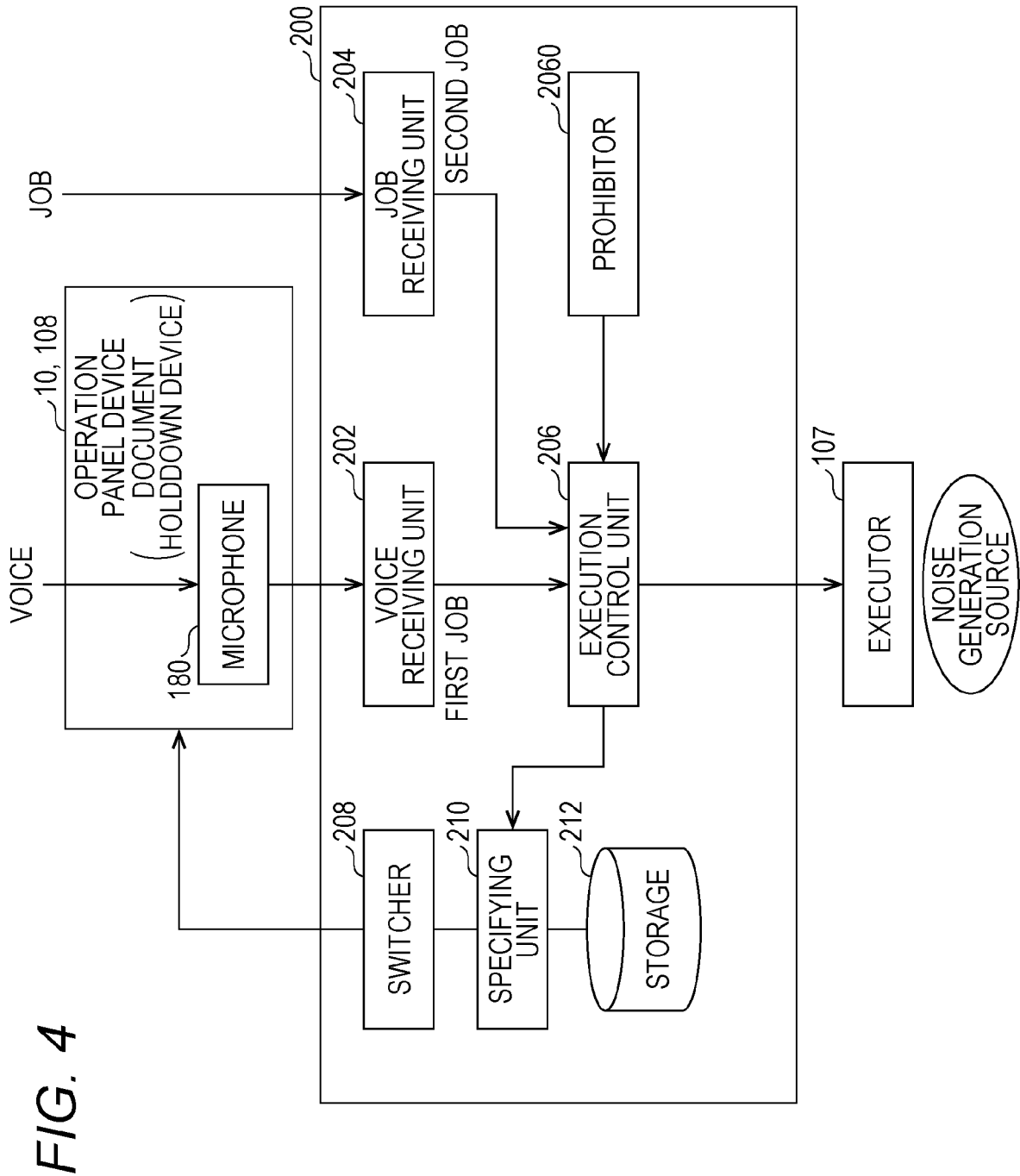
FIG. 4 is a diagram showing an example functional configuration of a control device of the image forming apparatus according to one or more embodiments.

FIG. 4 is a diagram showing an example functional configuration of a control device 200 of the image forming apparatus 1. The control device 200 is formed with the CPU 101, the ROM 102, the S-RAM 103, and the like, for example.

The control device 200 has the functions of a voice receiving unit 202, a job receiving unit 204, an execution control unit 206, a storage 212, a specifying unit 210, and a switcher 208.

As shown in FIG. 1 and the like, the microphone 180 is disposed on the operation panel device 10. When the user utters a voice to the microphone 180, the microphone 180 detects the voice. The voice (or a voice signal) detected by the microphone 180 is received by the voice receiving unit 202. The voice receiving unit 202 performs a voice recognition process on the received voice.

The voice receiving unit 202 refers to an acoustic model, a dictionary model, a language model, and the like stored beforehand in a predetermined storage area, and conducts voice analysis on the voice input from the microphone 180.

An acoustic model is a model in which the probabilistic association between voice feature amounts and phonetic symbols is shown in the form of data, for example. A speaker model is a model indicating the features (such as the speech frequency) of a voice. A dictionary model is a model in which notations and pronunciations of words are written, for example. A language model is a model in which the occurrence probability of each of the words written in the dictionary and the connection probabilities of each word with other words are shown in the form of data, for example.

The voice receiving unit 202 performs a voice recognition process, to specify a keyword indicating a job. The voice receiving unit 202 transmits a job signal indicating the job corresponding to the specified keyword to the execution control unit 206. The job corresponding to the identified keyword, which is the job based on the voice detected by the microphone 180, is referred to as the "first job". The job signal indicating the first job is referred to as the "first job signal".

For example, in a case where the user utters "make a copy", the voice receiving unit 202 specifies "copy" as the keyword by executing a voice recognition process. The voice receiving unit 202 recognizes "copy" corresponding to the keyword as the first job, and transmits the first job signal to the execution control unit 206.

The job receiving unit 204 receives a job that has been input to the image forming apparatus 1. Hereinafter, this job will be referred to as the "second job". The second job includes a job that is manually input to the image forming apparatus 1 by the user, and a job that is input to the image forming apparatus 1 from an external device (such as the PC 300). Further, while the first job is a job based on the voice detected by the microphone 180, the second job is a job not based on the voice detected by the microphone 180. In one or more embodiments, the first job and the second job are different jobs. The job receiving unit 204 transmits a second job signal indicating the second job, which has been input to the image forming apparatus 1, to the execution control unit 206.

Upon receipt of the first job signal, the execution control unit 206 transmits the control signal corresponding to the first job signal to the executor 107 corresponding to the job indicated by the first job signal. For example, in a case where the first job signal is a signal indicating an image forming job, the execution control unit 206 transmits the control signal (a signal for an image formation process to be performed) corresponding to the first job signal, to the image forming unit of the executor 107.

Upon receipt of the second job signal, the execution control unit 206 transmits the control signal corresponding to the second job signal to the executor 107 corresponding to the job indicated by the second job signal. For example, in a case where the second job signal is a signal indicating an image forming job, the execution control unit 206 transmits the control signal (a signal for an image formation process to be performed) corresponding to the second job signal, to the image forming unit of the executor 107.

Meanwhile, when the executor 107 executes a job, noise due to the job is generated. For example, when the executor 107 executes an image formation process, noise is generated from the drive mechanism (such as the engine) for driving the photosensitive drum.

For example, even when the user utters a voice during execution of an image forming job, or during generation of noise based on the image forming job, the noise is mixed with the voice, and therefore, the accuracy of voice recognition by the voice receiving unit 202 becomes lower. As a result, the voice receiving unit 202 fails to extract any keyword from the voice, and the user cannot cause the image forming apparatus 1 to execute the job (first job) desired by the user. In this manner, the noise caused by execution of a job hinders the voice receiving unit 202 from recognizing the voice.

In a case where the connection apparatus 520 (see FIG. 2) is connected to the image forming apparatus 1, when the connection apparatus 520 executes a job, noise is also generated from the connection apparatus 520. For example, in a case where the post-processing device 500 of the connection apparatus 520 performs a finisher job (finisher processing), noise based on the finisher job is generated. Further, in a case where the sheet container device 400 of the connection apparatus 520 executes a conveyance job for conveying a paper sheet stored in the sheet container device 400 to the image forming apparatus 1, noise based on the conveyance job is generated. Even if the noise (the noise in the connection apparatus 520) is mixed with the voice from the user, the accuracy of the voice recognition by the voice receiving unit 202 for the voice becomes lower.

Meanwhile, the position of the source of the noise generation caused by execution of a job varies depending on the type of the job executed by the image forming apparatus 1 and the connection apparatus 520. For example, there are differences among the position of the source of the noise generation to be caused by execution of an image forming job in a case where the image forming apparatus 1 executes the image forming job, the position of the source of the noise generation to be caused by execution of a scan job in a case where the image forming apparatus 1 executes the scan job, the position of the source of the noise generation to be caused by execution of a conveyance job in a case where the sheet container device 400 executes the conveyance job, and the position of the source of the noise generation to be caused by execution of a post-processing job in a case where the post-processing device 500 executes the post-processing job.

Therefore, as described below, the control device 200 performs a process for restricting the noise caused by execution of a job from hindering the voice receiving unit 202 from recognizing the voice, while taking into account the fact that the position of the noise generation source varies depending on the type of the executed job.

In one or more embodiments, the microphone 180 (the position of voice detection by the microphone 180) can be moved to either a first position (home position) or a second position. In other words, the position of voice detection by the microphone 180 includes the first position and the second position.

Figure 14:
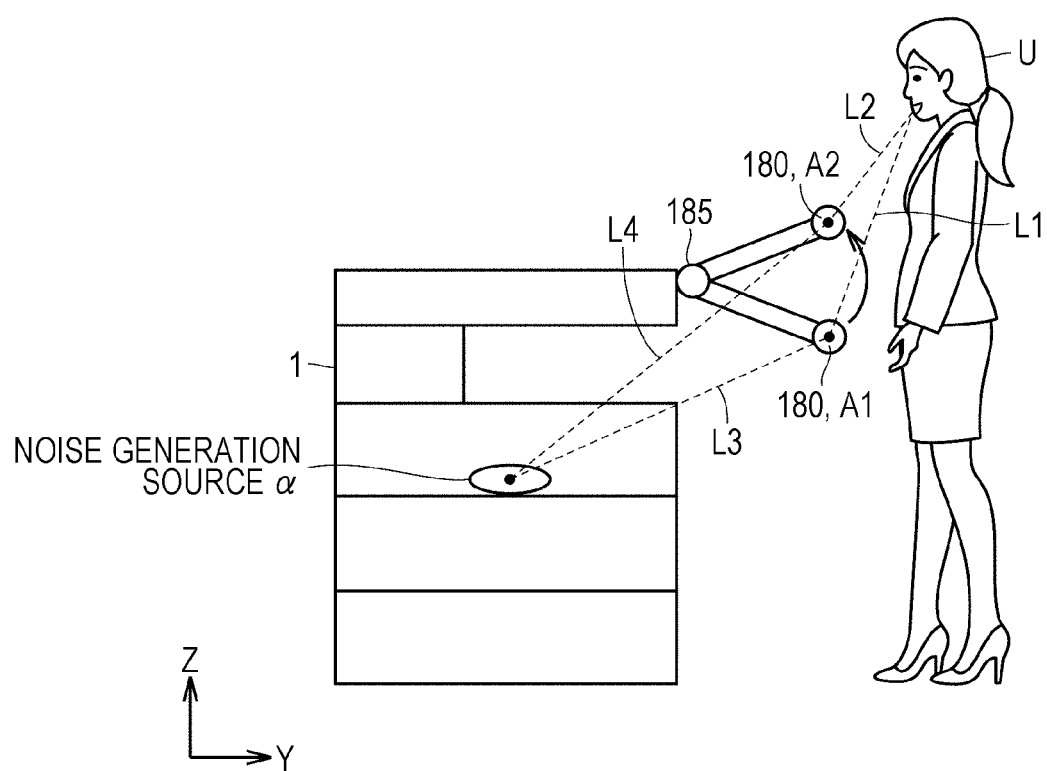
FIG. 14 is a diagram showing the relationship among a microphone, a user, and a noise generation source (part 1) according to one or more embodiments.

As shown in FIG. 14 and others, the second position is a position at which the distance to the source of the noise generation caused by a job is longer than the distance from the first position to the source of the noise generation. The second position is also a position at which the distance to the user is shorter than the distance from the first position to the user. That is, the second position is a position at which the amount of noise to be detected by the microphone can be made smaller than that at the first position. In other words, the second position is a position at which the accuracy of recognition of voices from the user by the voice receiving unit 202 can be made higher. On the other hand, the first position is a position at which any action (such as an action to set a document on the image forming apparatus 1) to be performed on the image forming apparatus 1 by the user is not hindered.

In a case where the voice receiving unit 202 detects an input of a voice from the user, the specifying unit 210 specifies the destination of the microphone 180. Here, the position of the destination of the microphone 180 is a position corresponding to the second position. The position of the destination of the microphone 180 is a position away from the noise generation source, which is a position at which noise is not easily mixed with the voice from the user.

FIG. 5 is a diagram showing an example of associated information. The associated information is information that is created in advance, and is stored beforehand into the storage 212. In the example illustrated in FIG. 5, the locations of noise generation sources are associated with the positions (second positions) of destinations of the microphone 180, with the types of the connection apparatus 520 and the types of jobs serving as keys, in the associated information. "No connection apparatus", "sheet container device 400", "post-processing device 500", and "sheet container device 400 and post-processing device 500" are set as the types of the connection apparatus 520.

Also, one-side printing, two-side printing, and scan are defined as the types of jobs. For example, in a case where the connection apparatus 520 is not connected to the image forming apparatus 1, and the job being executed is one-side printing, the location of the noise generation source is P1, and the position of the destination of the microphone 180 is Q1.

Further, in a case where the sheet container device 400 and the post-processing device 500 are connected as the connection apparatus 520 to the image forming apparatus 1, and the job being executed is two-side printing, for example, the location of the noise generation source is P10, and the position of the destination of the microphone 180 is Q10. In the example shown in FIG. 5, each position Q of the destination of the microphone 180 is a second position.

In FIG. 5, serial numbers 1 through 12 are assigned to the locations P of the noise generation source and the detection positions Q of the microphone, for convenience. In FIG. 5, at least two of the noise source locations P1 through P12 may be the same noise generation source location. Accordingly, in FIG. 5, at least two of the detection positions Q1 through Q12 of the microphone may be the same microphone detection position.

Further, in a modification, the location of the noise generation source may not be stored in association with the associated information shown in FIG. 5. That is, the associated information may be information in which the destinations of the microphone 180 are associated, with the types of connection apparatus and the types of jobs serving as keys.

Further, in another modification, any connection apparatus type may not be specified in the associated information for an image forming apparatus to which the connection apparatus 520 is not connected, for example. For example, the locations P of the noise generation source may be associated with the destinations of the microphone, with the types of jobs serving as keys, in the associated information.

After specifying the destination of the microphone 180, the specifying unit 210 transmits the specified destination of the microphone 180 to the switcher 208. The switcher 208 performs switching control for switching the position of voice detection to be performed by microphone 180. In one or more embodiments, the switching control is prompting control for prompting the user to move the microphone 180 to the destination of the microphone 180 specified by the specifying unit 210. In the description below, the "position of voice detection to be performed by the microphone 180" may also be referred to as the "position of the microphone 180".

<D. Specific Examples of the Prompting Control>

Figure 6:
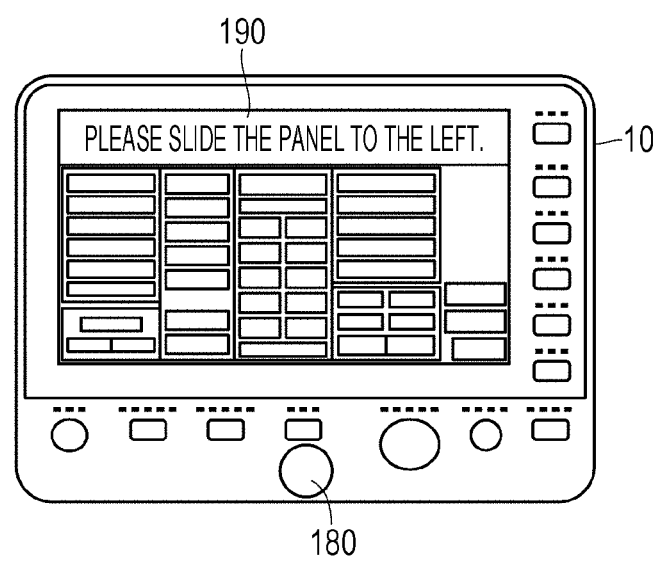
FIG. 6 is a diagram illustrating an example of prompting control (part 1) according to one or more embodiments.

Next, the prompting control (switching control) to be performed by the switcher 208 is described in detail. FIG. 6 is a diagram illustrating an example of the prompting control. In the example illustrated in FIG. 6, the microphone 180 is disposed in a lower central portion of the operation panel device 10. Further the switcher 208 displays a prompting image 190 in the prompting control. The prompting image 190 is an image for prompting the user to move the microphone 180 to the "position of the destination of the microphone 180" specified by the specifying unit 210. In the example illustrated in FIG. 6, the prompting image 190 is a text image reading "Please slide the panel to the left". In the example illustrated in FIG. 6, the switcher 208 displays the prompting image 190 in an upper region of the display region of the operation panel device 10. In a modification, the switcher 208 may display the prompting image 190 in a region other than the upper region of the display region of the operation panel device 10. In another modification, the switcher 208 may perform the prompting control, without displaying any image. Alternatively, the switcher 208 may output a voice in the prompting control. For example, the switcher 208 may output a voice saying "Please slide the panel to the left" from a speaker (not shown).

Figure 7A:
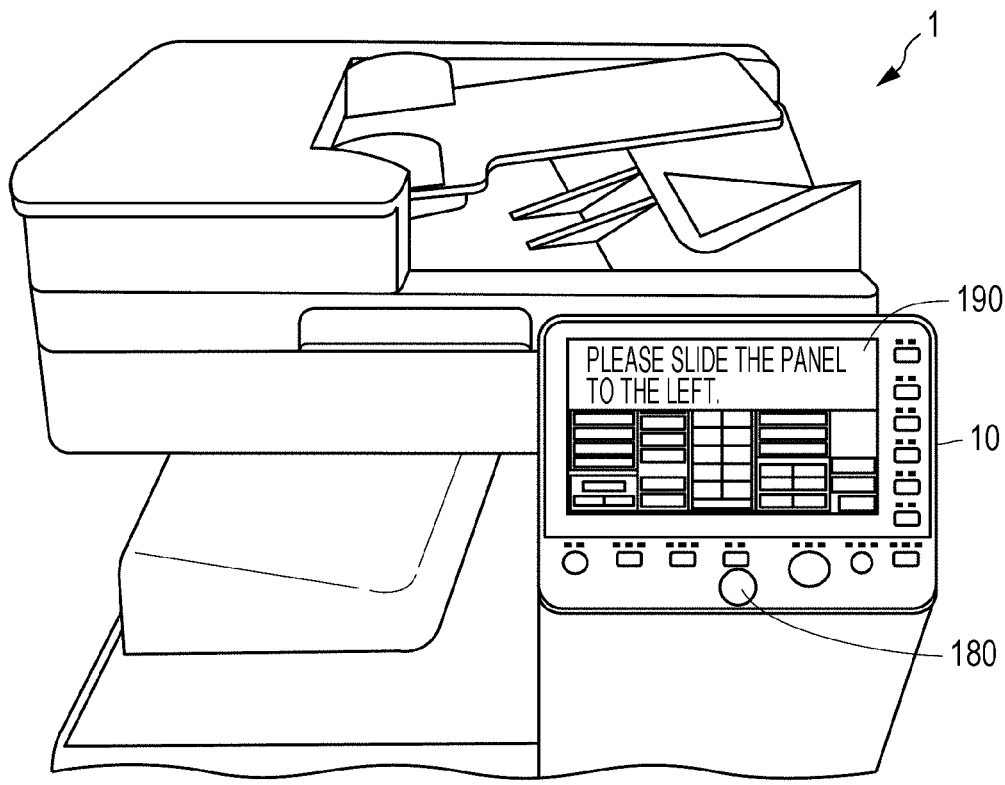
FIGS. 7A and 7B are diagrams illustrating an example of prompting control (part 2) according to one or more embodiments.
Figure 7B:
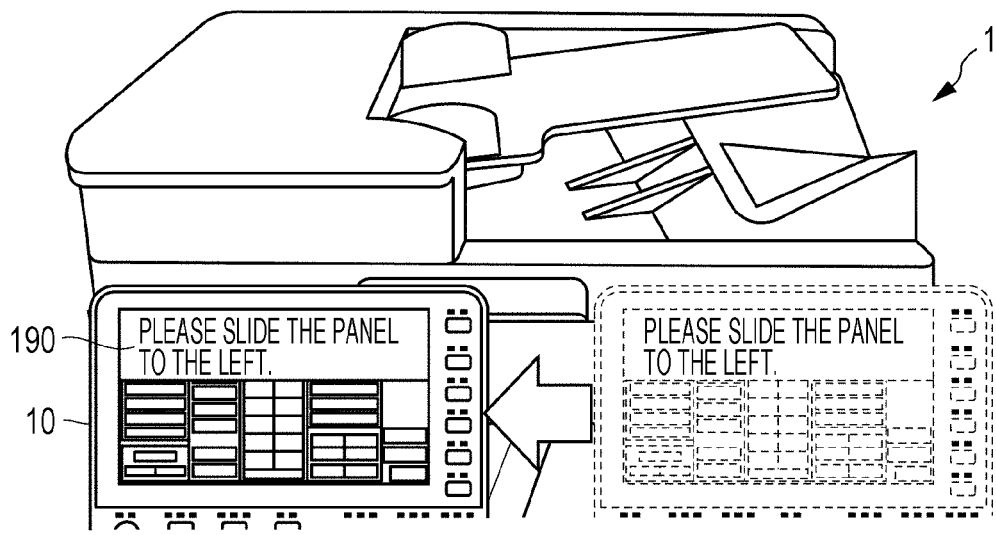

FIGS. 7A and 7B illustrate a case where the specifying unit 210 has specified a "position on the left side (the negative direction in the X-axis direction) as viewed from the user standing in front of the image forming apparatus 1" as the position (second position) of the destination of the microphone 180. FIG. 7A shows a case where the microphone 180 is located at the first position. FIG. 7B shows a case where the operation panel device 10 has been slid to the left (the negative direction in the X-axis direction) by the user, and thus, the position of the microphone 180 has been switched to the second position.

As shown in FIG. 7A, the switcher 208 displays the prompting image 190 described above with reference to FIG. 6. The user who has visually recognized the prompting image 190 slides the operation panel device 10 to the left. As a result, the operation panel device 10 is slid to the left, as shown in FIG. 7B. As the operation panel device 10 is located on the left side, the microphone 180 (or the voice detection position of the microphone 180) is located at the second position.

Figure 8A:
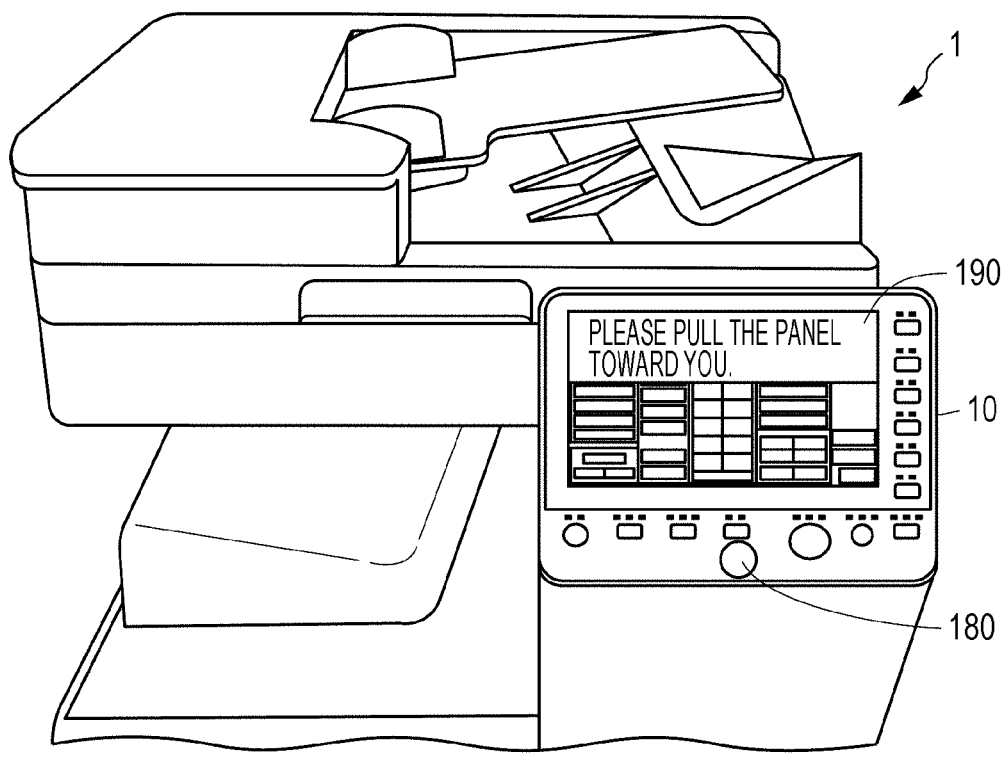
FIGS. 8A and 8B are diagrams illustrating an example of prompting control (part 3) according to one or more embodiments.
Figure 8B:
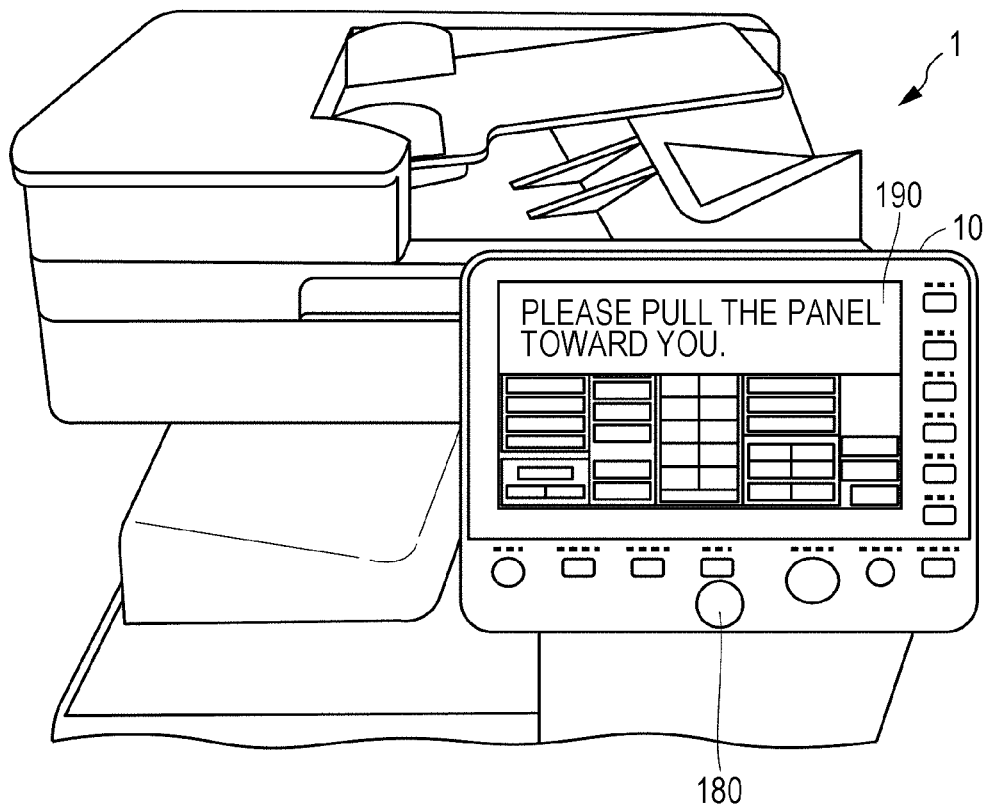

FIGS. 8A and 8B illustrate a case where the specifying unit 210 has specified a "position on the front side (the positive direction in the Y-axis direction) as viewed from the user standing in front of the image forming apparatus 1" as the position (second position) of the destination of the microphone 180. FIG. 8A shows a case where the microphone 180 is located at the first position. FIG. 8B shows a case where the operation panel device 10 has been moved to the front (the positive direction in the Y-axis direction) by the user, and thus, the position of the microphone 180 has been switched to the second position.

As shown in FIG. 8A, the switcher 208 displays a prompting image 190 reading "Please pull the panel toward you". The user who has visually recognized the prompting image 190 moves the operation panel device 10 to the front. As a result, the operation panel device 10 is moved to the front, as shown in FIG. 8B. As the operation panel device 10 is located on the front side, the microphone 180 (or the voice detection position of the microphone 180) is located at the second position.

Figure 9A:
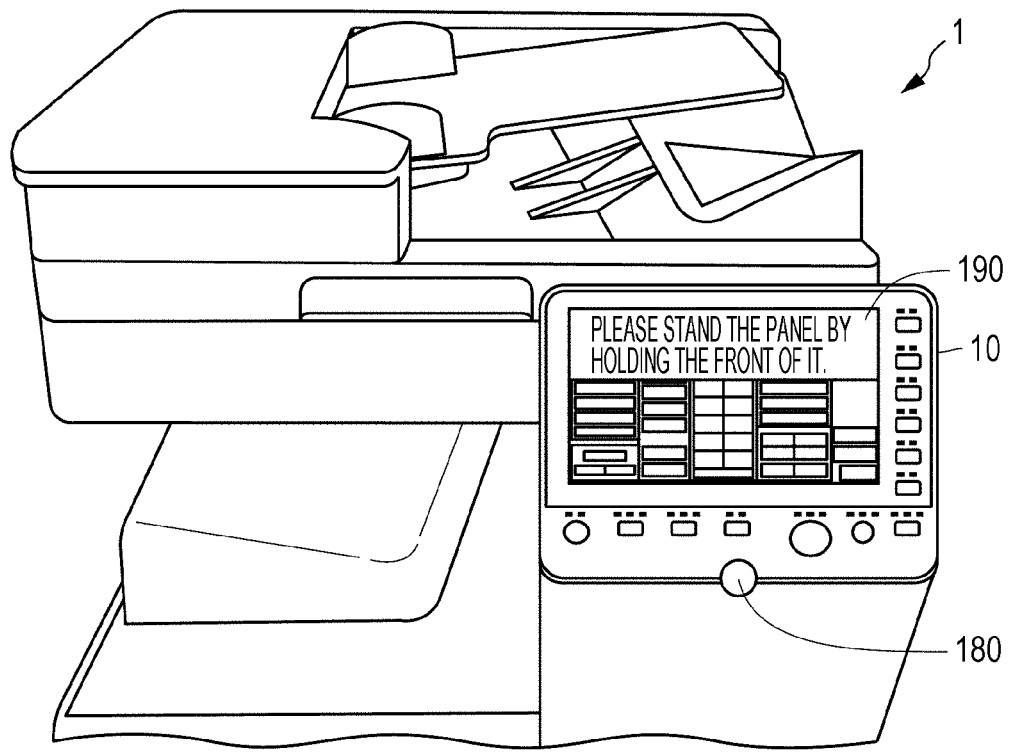
FIGS. 9A and 9B are diagrams illustrating an example of prompting control (part 4) according to one or more embodiments.
Figure 9B:
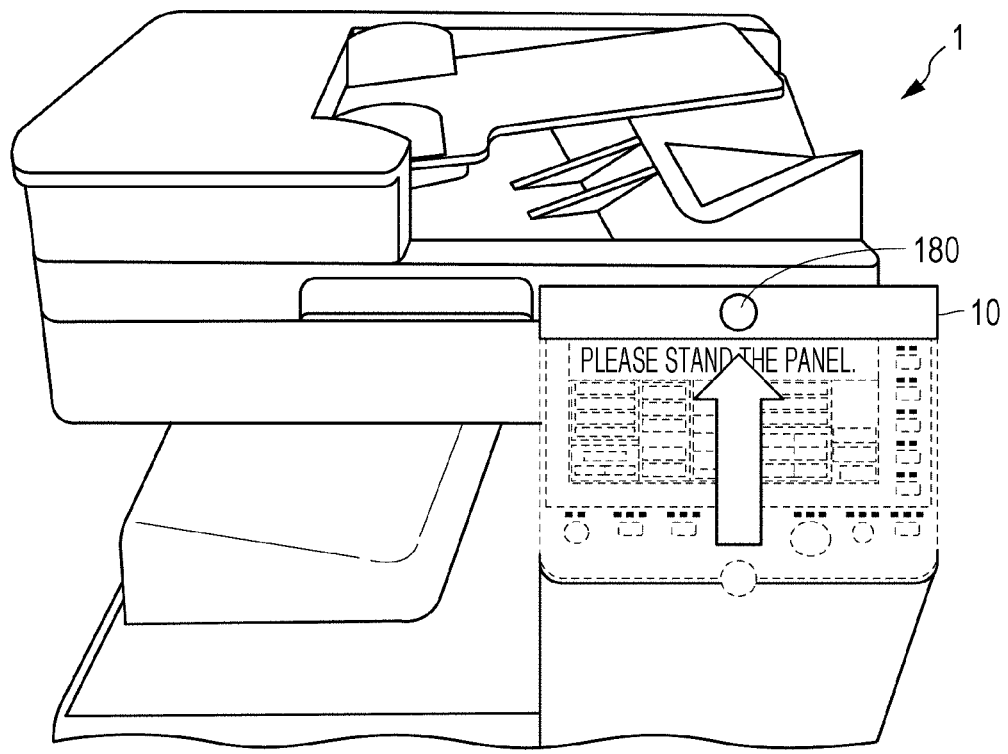

FIGS. 9A and 9B illustrate a case where the specifying unit 210 has specified a "position on the upper side (the positive direction in the Z-axis direction) as viewed from the user standing in front of the image forming apparatus 1" as the position (second position) of the destination of the microphone 180. FIG. 9A shows a case where the microphone 180 is located at the first position. FIG. 9B shows a case where the operation panel device 10 has been moved upward (the positive direction in the Z-axis direction) by the user, and thus, the position of the microphone 180 has been switched to the second position.

As shown in FIG. 9A, the switcher 208 displays a prompting image 190 reading "Please stand the panel, holding the front of it". The user who has visually recognized the prompting image 190 moves the operation panel device 10 so that the operation panel device 10 stands. As a result, the microphone 180 is moved in the positive direction in the Z-axis direction, so that the microphone 180 (or the voice detection position of the microphone 180) is located at the second position, as shown in FIG. 9B.

The user emits a voice when the microphone 180 is located the second position (a position farther from the noise source as shown in FIGS. 7B, 8B, and 9B), so that the degree of noise mixed with the voice can be made lower than that in a case where a voice is emitted when the microphone 180 is located at the first position (a position closer to the noise source). Accordingly, in a case where a voice is emitted when the microphone 180 is located at the second position, the accuracy of recognition of the voice by the voice receiving unit 202 can be made higher than that in a case where a voice is emitted when the microphone 180 is located at the first position.

Figure 10A:
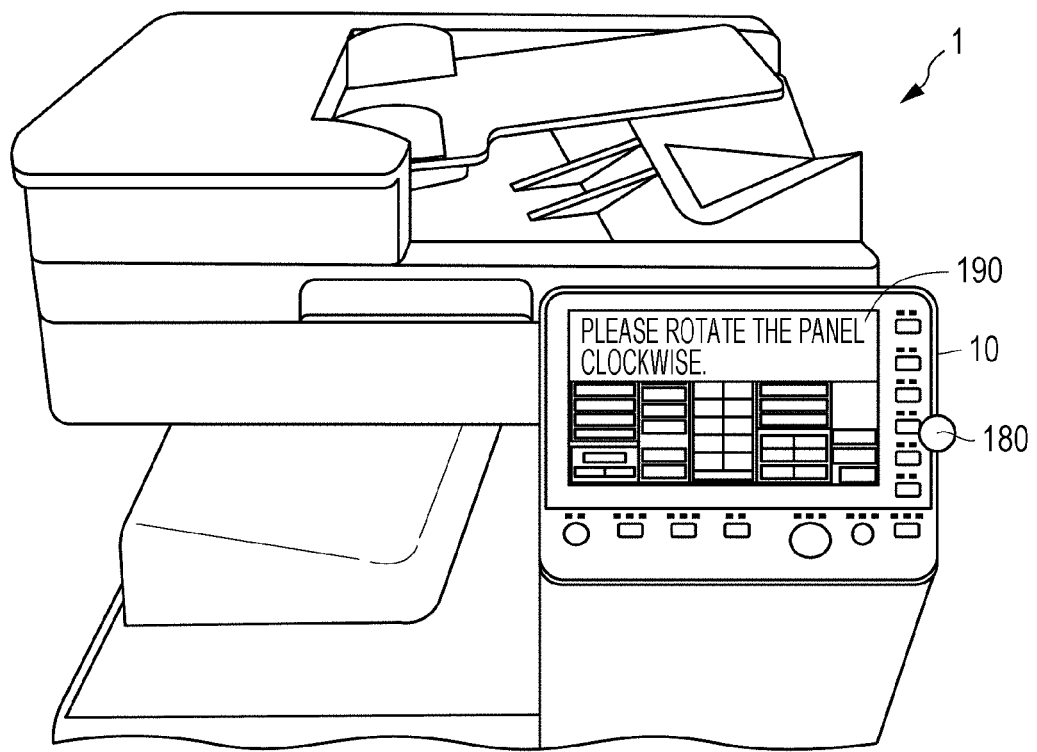
FIGS. 10A and 10B are diagrams illustrating an example of prompting control (part 5) according to one or more embodiments.
Figure 10B:
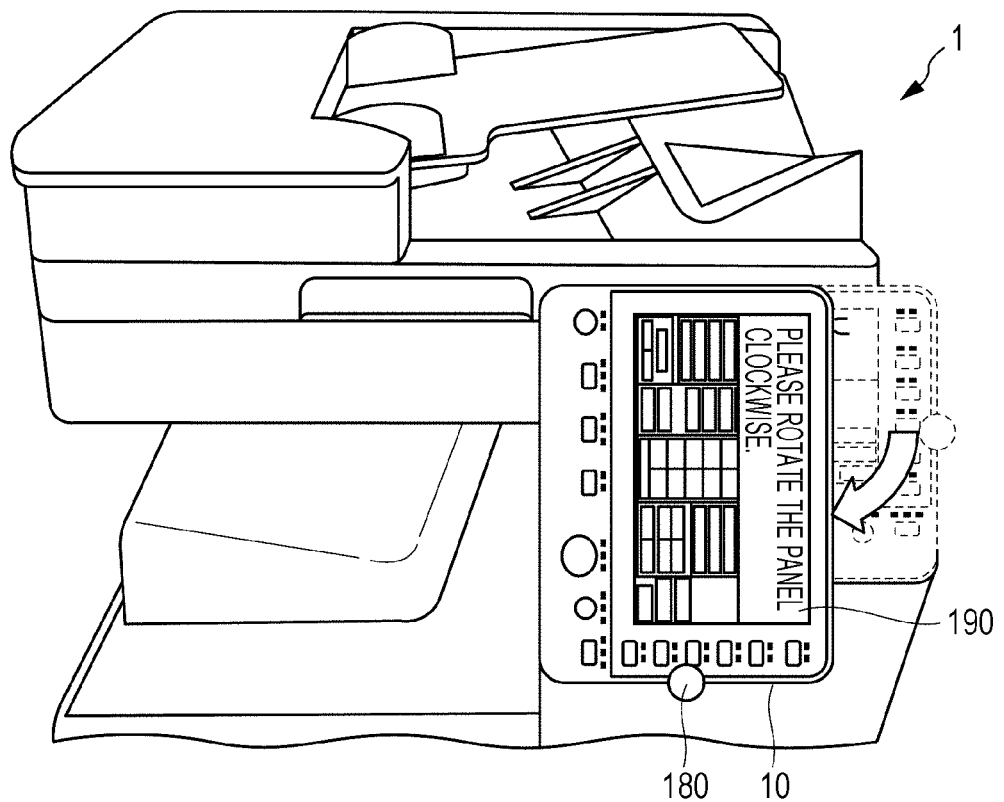

Next, an example in which the microphone 180 is disposed at a position on the right side of the operation panel device 10 as viewed from the user standing in front of the image forming apparatus 1 is described as a first modification, with reference to FIGS. 10A and 10B. FIGS. 10A and 10B illustrate a case where the specifying unit 210 has specified a "position on the lower side (the negative direction in the Z-axis direction) as viewed from the user standing in front of the image forming apparatus 1" as the position (second position) of the destination of the microphone 180. FIG. 10A shows a case where the microphone 180 is located at the first position. As shown in FIG. 10A, the switcher 208 displays a prompting image 190 reading "Please turn the panel clockwise". The user who has visually recognized the prompting image 190 moves the operation panel device 10 to rotate clockwise. As a result, the microphone 180 is moved in the negative direction in the Z-axis direction, so that the microphone 180 (or the voice detection position of the microphone 180) is located at the second position, as shown in FIG. 10B.

Figure 11A:
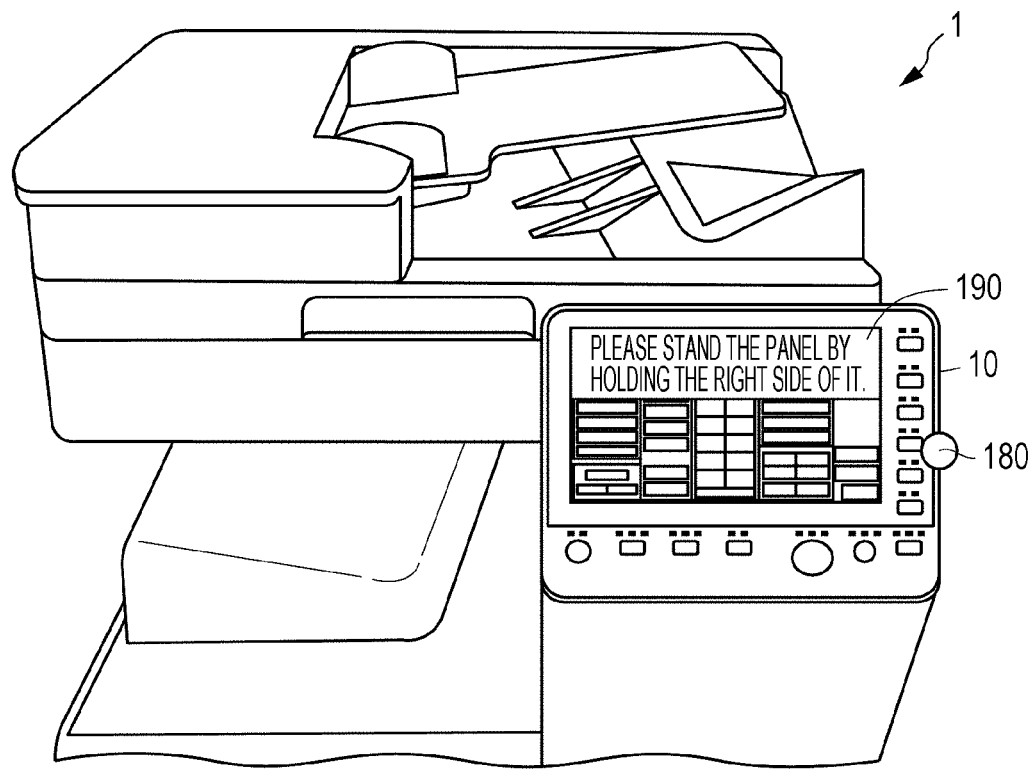
FIGS. 11A and 11B are diagrams illustrating an example of prompting control (part 6) according to one or more embodiments.
Figure 11B:
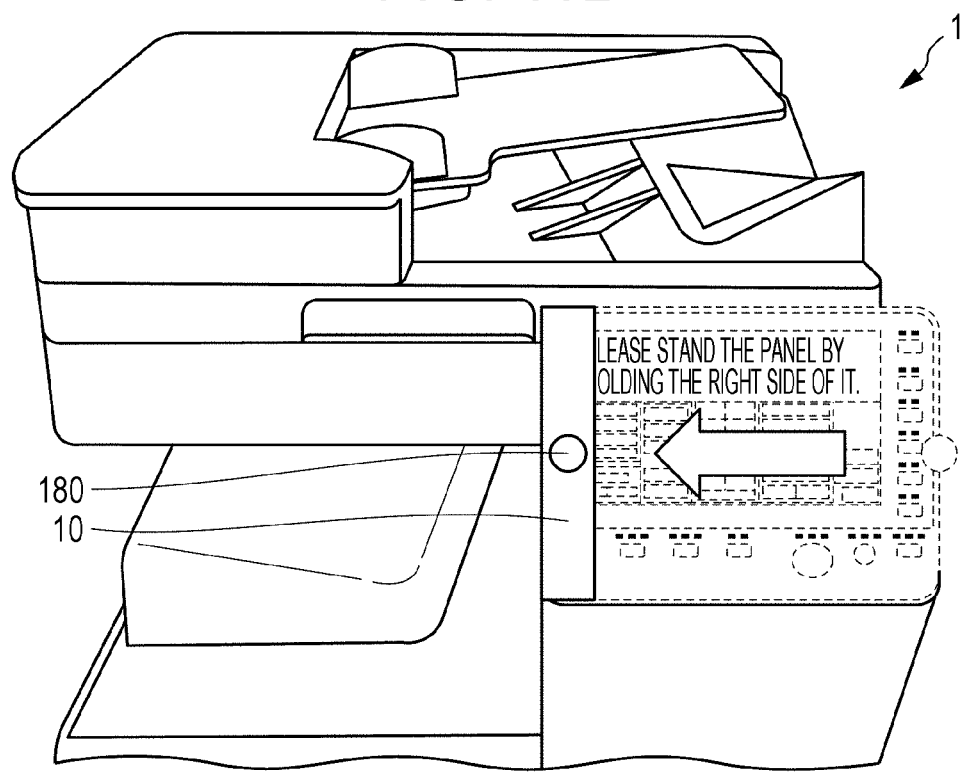

FIGS. 11A and 11B illustrate a case where the specifying unit 210 has specified a "position on the front side (the positive direction in the Y-axis direction) as viewed from the user standing in front of the image forming apparatus 1" as the position (second position) of the destination of the microphone 180 in the first modification. FIG. 11A shows a case where the microphone 180 is located at the first position. As shown in FIG. 11A, the switcher 208 displays a prompting image 190 reading "Please stand the panel, holding the right side of it". The user who has visually recognized the prompting image 190 moves the operation panel device 10 so that the operation panel device 10 stands. As a result, the microphone 180 is moved in the positive direction in the Y-axis direction, so that the microphone 180 (or the voice detection position of the microphone 180) is located at the second position, as shown in FIG. 11B.

Figure 12A:
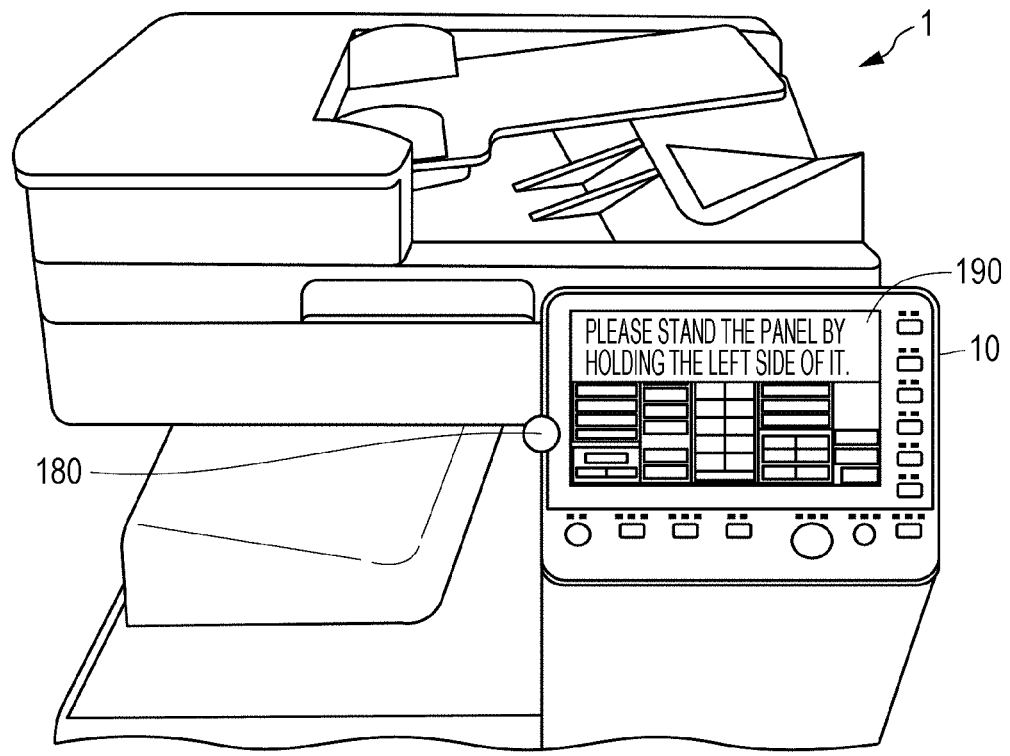
FIGS. 12A and 12B are diagrams illustrating an example of prompting control (part 7) according to one or more embodiments.
Figure 12B:
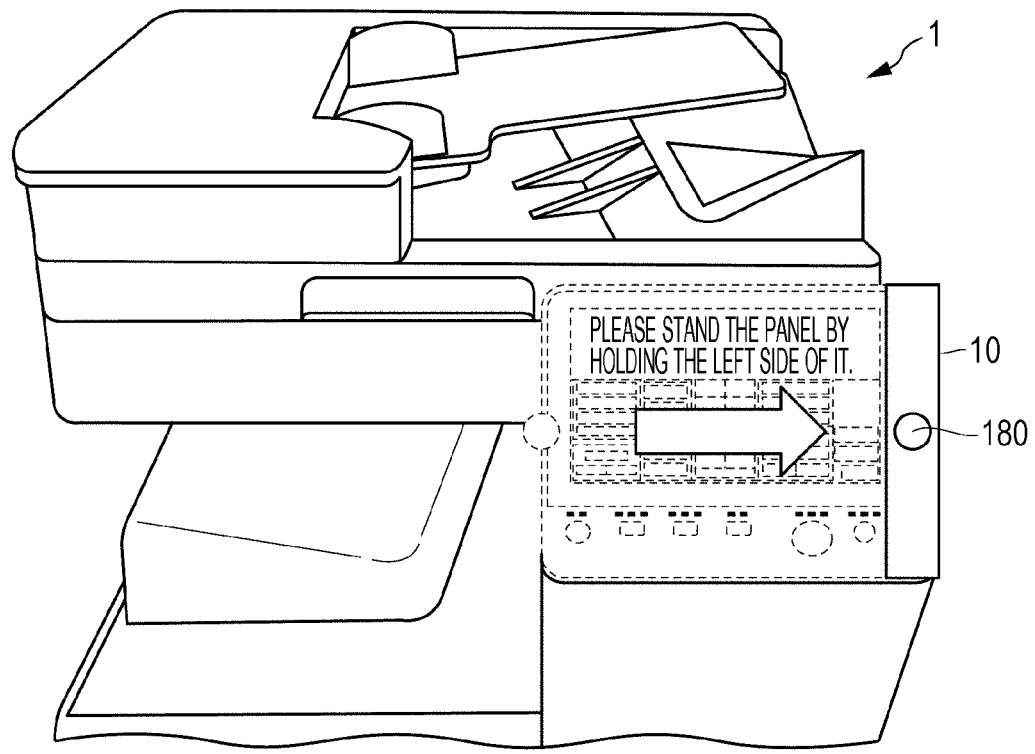

Next, an example in which the microphone 180 is disposed at a position on the left side of the operation panel device 10 as viewed from the user standing in front of the image forming apparatus 1 is described as a second modification, with reference to FIGS. 12A and 12B. FIGS. 12A and 12B illustrate a case where the specifying unit 210 has specified a "position on the front side (the positive direction in the Y-axis direction) as viewed from the user standing in front of the image forming apparatus 1" as the position (second position) of the destination of the microphone 180. FIG. 12A shows a case where the microphone 180 is located at the first position. As shown in FIG. 12A, the switcher 208 displays a prompting image 190 reading "Please stand the panel, holding the left side of it". The user who has visually recognized the prompting image 190 moves the operation panel device 10 so that the operation panel device 10 stands. As a result, the microphone 180 is moved in the positive direction in the Y-axis direction, so that the microphone 180 (or the voice detection position of the microphone 180) is located at the second position, as shown in FIG. 12B.

Figure 13A:
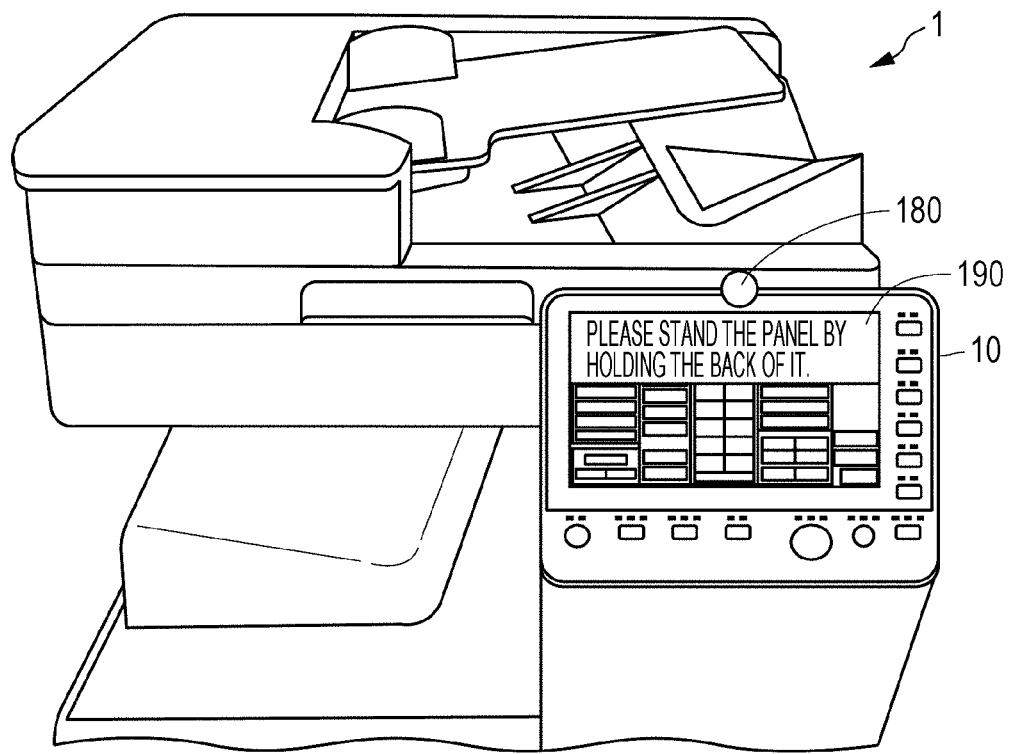
FIGS. 13A and 13B are diagrams illustrating an example of prompting control (part 8) according to one or more embodiments.
Figure 13B:
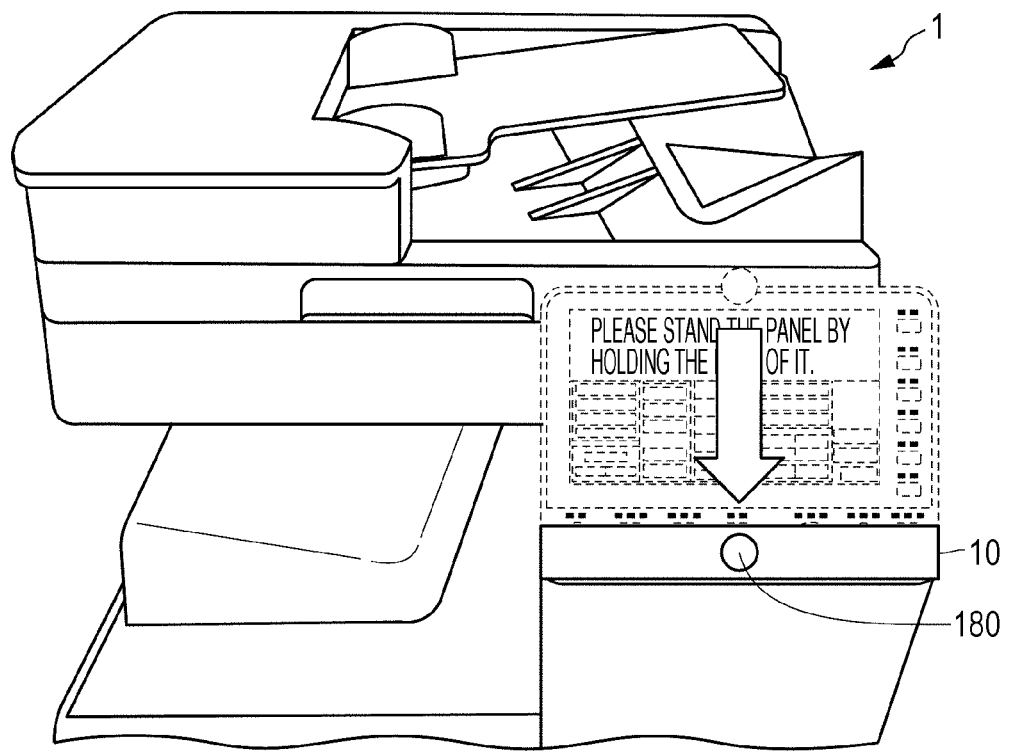

Next, an example in which the microphone 180 is disposed at a position on the upper side of the operation panel device 10 as viewed from the user standing in front of the image forming apparatus 1 is described as a third modification, with reference to FIGS. 13A and 13B. FIGS. 13A and 13B illustrate a case where the specifying unit 210 has specified a "position on the front side (the positive direction in the Y-axis direction) as viewed from the user standing in front of the image forming apparatus 1" as the position (second position) of the destination of the microphone 180. FIG. 13A shows a case where the microphone 180 is located at the first position. As shown in FIG. 13A, the switcher 208 displays a prompting image 190 reading "Please stand the panel, holding the back of it". The user who has visually recognized the prompting image 190 moves the operation panel device 10 so that the operation panel device 10 stands. As a result, the microphone 180 is moved in the positive direction in the Y-axis direction, so that the microphone 180 (or the voice detection position of the microphone 180) is located at the second position, as shown in FIG. 13B.

Even if the image forming apparatus 1 has a configuration as shown in one of the first through third modifications, the user emits a voice while the microphone 180 is located at the second position (a position farther from the noise source), so that the accuracy of recognition of the voice can be made higher than that in a case where a voice is emitted while the microphone 180 is located at the first position (a position closer to the noise source).

[Distance Between the Microphone and a User, and the Distance Between the Microphone and a Noise Generation Source]

FIG. 14 is a diagram showing the distance between the microphone 180 and a user U, and the distance between the microphone 180 and a noise generation source $\alpha$. In the example illustrated in FIG. 14, the microphone 180 located at the first position is shown as a microphone 180 (A1). The microphone 180 located at the second position is shown as a microphone 180 (A2). In the example illustrated in FIG. 14, the distance between the user U (the mouth of the user U) and the microphone 180 (A1) is a distance L1. The distance between the user U (the mouth of the user U) and the microphone 180 (A2) is a distance L2. The distance between the noise generation source $\alpha$ and the microphone 180 (A1) is a distance L3. The distance between the noise generation source $\alpha$ and the microphone 180 (A2) is a distance L4. Hereinafter, the first position will also be referred to as "first position A1", and the second position will also be referred to as the "second position A2".

As shown in FIG. 14, the distance L4 is longer than the distance L3. Specifically, the distance L4 between the microphone 180 (A1) and the noise generation source $\alpha$ when the microphone 180 is located at the first position A1 is longer than the distance L3 between the microphone 180 (A2) and the noise generation source $\alpha$ when the microphone 180 is located at the second position A2.

Further, the distance L1 is longer than the distance L2, as shown in FIG. 14. Specifically, the distance L2 between the microphone 180 (A2) and the user U (the mouth of the user U) when the microphone 180 is located at the second position A2 is shorter than the distance L1 between the microphone 180 (A1) and the user U (the mouth of the user U) when the microphone 180 is located at the first position A1. In the example illustrated in FIG. 14, the operation panel device 10 rotates about a drive shaft 185. Further, the configuration described with reference to FIGS. 9A and 9B may be a configuration in which the microphone 180 reaches the second position A2 as the operation panel device 10 is driven about the drive shaft 185, as described above with reference to FIG. 14.

Figure 15A:
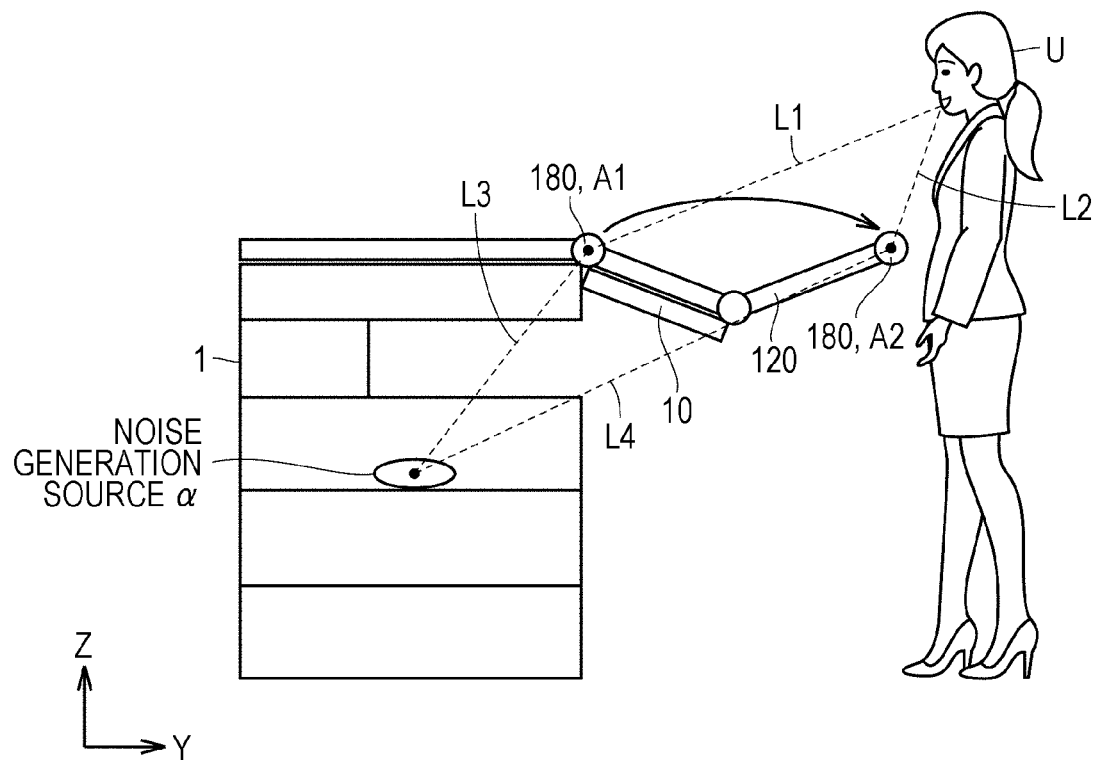
FIGS. 15A and 15B are diagrams showing the relationship among a microphone, a user, and a noise generation source (part 2) according to one or more embodiments.
Figure 15B:
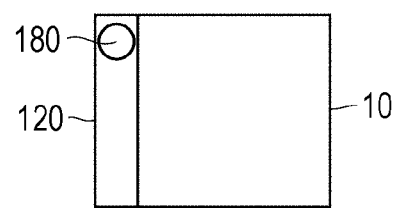

Next, a fourth modification is described with reference to FIGS. 15A and 15B. As shown in FIG. 15B, in the fourth modification, an arm 120 is provided on the right or left side (on the left side in the example illustrated in FIGS. 15A and 15B) of the operation panel device 10 as viewed from the user standing in front of the image forming apparatus 1, and the microphone 180 is attached to the arm 120. The user drives the arm 120, to move the microphone 180 toward himself/herself, for example. As shown in FIG. 15A, in the configuration of the fourth modification, the distance L1 is also longer than the distance L2, and the distance L4 is also longer than the distance L3.

The second position A2 is a position at which the degree of noise mixed with a voice emitted by the user can be made lower than that at the first position A1. The second position A2 is also a position at which the microphone 180 is closer to the user than at the first position A1. Therefore, the second position A2 is a position at which an action (such as an action to set a document on the image forming apparatus) to be performed on the image forming apparatus by the user who has finished a voice input process is more easily hindered than at the first position A1. In a case where the user causes the image forming apparatus 1 to execute a copy job, for example, the user normally sets a document on the image forming apparatus 1 after emitting a voice saying "Copy". In this case, if the microphone 180 remains at the second position A2, the user's action on the image forming apparatus (such as an action to set a document on the image forming apparatus) might be hindered.

Therefore, in one or more embodiments, when the switcher 208 determines that a voice recognition process for recognizing a voice from the user has finished, the switcher 208 returns the microphone 180 from the second position A2 to the first position A1. Accordingly, it is possible to prevent hindrance to an action (such as an action to set a document on the image forming apparatus) to be performed on the image forming apparatus by the user who has finished a voice input process. For example, in a case where a period during which the voice receiving unit 202 does not detect any voice from the user reaches a certain period (five seconds, for example), the switcher 208 determines that the voice recognition process for recognizing a voice from the user has finished.

[Flowchart of a Process to be Performed by the Image Forming Apparatus]

Figure 16:
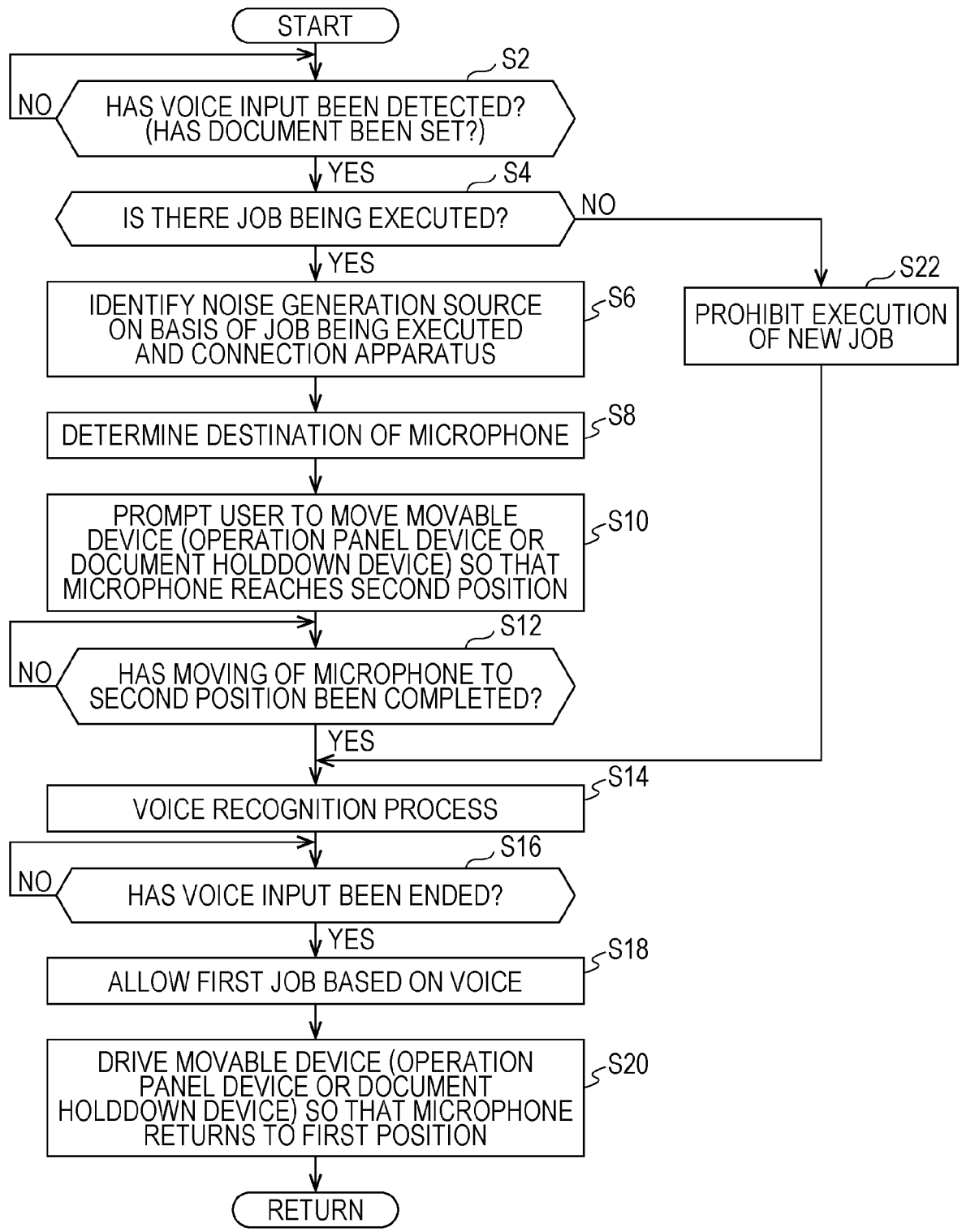
FIG. 16 is a flowchart showing a process to be performed by the image forming apparatus according to one or more embodiments.

Next, a flowchart of a process to be performed by the image forming apparatus 1 is described. FIG. 16 is a flowchart of a process to be performed by the image forming apparatus 1.

First, in step S2, the voice receiving unit 202 determines whether a voice from a user has been detected. The process in step S2 is repeated (NO in step S2) until the voice receiving unit 202 detects a voice from a user. If the voice receiving unit 202 detects a voice from a user in step S2 (YES in step S2), the process moves on to step S4.

In step S4, the execution control unit 206 determines whether there is a job currently being executed. If the execution control unit 206 determines in step S4 that there is no job currently being executed (NO in step S4), the process moves on to step S22. In step S22, a prohibitor 2060 prohibits execution of a new job (a new second job, for example). In step S22, the prohibitor 2060 stores an execution prohibition flag into the storage 212, for example. The execution prohibition flag is a flag indicating that a new job is prohibited, for example. When the process in step S22 is completed, the process moves on to step S14.

If the execution control unit 206 determines in step S4 that there is a job currently being executed (YES in step S4), the process moves on to step S6. In step S6, the specifying unit 210 refers to the associated information shown in FIG. 5, and identifies the location P of the noise generation source on the basis of the connected connection apparatus 520 and the type of the job being executed. In step S8, the specifying unit 210 refers to the associated information shown in FIG. 5, and specifies the position Q (the second position A2) of the destination of the microphone 180 on the basis of the connected connection apparatus 520 and the type of the job being executed.

The switcher 208 then prompts the user to drive the movable device (the operation panel device 10 in one or more embodiments) so that the microphone 180 reaches the second position A2. The prompting is displaying a prompting image 190 as illustrated in FIGS. 6 through 13B.

In step S12, the switcher 208 determines whether the moving of the microphone 180 to the second position A2 has been completed. For example, in a case where the switcher 208 determines that the operation panel device 10 has been driven as instructed by the displayed prompting image 190, the switcher 208 determines that the moving of the microphone 180 to the second position A2 has been completed.

In step S12, the switcher 208 repeats the process in step S12 (NO in step S12) until the switcher 208 determines that the moving of the microphone 180 to the second position A2 has been completed. If the switcher 208 determines that the moving of the microphone 180 to the second position A2 has been completed (YES in step S12), the process moves on to step S14.

In a modification, the switcher 208 may perform a process of determining whether a predetermined time (five seconds, for example) has elapsed since the prompting control in step S10 was performed (since the prompting image 190 was displayed), instead of the process in step S12. This process is repeated until the switcher 208 determines that the predetermined time has elapsed. When the switcher 208 determines that the predetermined time has elapsed, the process moves on to step S14.

In step S14, the voice receiving unit 202 starts a voice recognition process. In step S16, the voice receiving unit 202 determines whether the voice input by the user has finished. In step S16, the voice receiving unit 202 repeats the process in step S16 (NO in step S16) until the voice receiving unit 202 determines that the voice input by the user has finished. If the voice receiving unit 202 determines in step S16 that the voice input by the user has finished (YES in step S16), the process moves on to step S18.

In step S18, the execution control unit 206 allows execution of a job (a first job) based on the result of the voice recognition performed in step S14. Here, allowing execution means that, if the executor 107 can execute a job based on the result of the voice recognition performed in step S14, the executor 107 executes the job.

Further, allowing execution means that, if the executor 107 requires further action (such as an action on the start button) from the user with respect to the job based on the result of the voice recognition performed in step S14, the executor 107 executes the job when the user performs the action.

In step S20, the switcher 208 drives the movable device (the operation panel device 10 in one or more embodiments) so that the microphone 180 at the second position A2 returns to the first position A1. For example, the operation panel device 10 in the state illustrated in FIG. 7B is returned to the state illustrated in FIG. 7A. The execution prohibition flag is deleted in conjunction with the process in step S18 or the process in step S20.

BRIEF SUMMARY (1) In a case where the position of voice detection to be performed by a microphone is fixed as in conventional cases, an action to be performed on the image forming apparatus by the user who has finished a voice input process might be hindered by the microphone. Therefore, in the image forming apparatus 1 of one or more embodiments, the switcher 208 performs switching control for switching the position of voice detection to be performed by the microphone 180 (or the position of the microphone 180), depending on the job being executed by the executor 107 (see FIGS. 7A and 7B, for example). In this manner, the position of voice detection to be performed by the microphone 180 is switched depending on the job type. Thus, even in a case where the source of noise generation varies with job types, the microphone 180 can be prevented from detecting noise in addition to a voice, whenever possible.

(2) The position of voice detection to be performed by the microphone includes the first position A1, and the second position A2 at which the distance to the noise generation source α caused by the job being executed by the executor 107 is longer than that at the first position A1 (see FIG. 14, for example). Accordingly, by switching the position of voice detection to be performed by the microphone to the second position A2, the switcher 208 can reduce the influence of the noise on the voice, and thus, increase the accuracy of recognition of the voice from the user.

(3) The position of voice detection to be performed by the microphone includes the first position A1, and the second position A2 at which the distance to the user U is shorter than that at the first position A1 (see FIG. 14, for example). Accordingly, by switching the position of voice detection to be performed by the microphone to the second position A2, the switcher 208 can reduce the influence of the noise on the voice, and thus, increase the accuracy of recognition of the voice from the user.

(4) The image forming apparatus 1 of one or more embodiments includes a movable device (the operation panel device 10 in one or more embodiments) including the microphone 180. Further, when the operation panel device 10 is driven by the user, the position of the microphone 180 (the position of voice detection to be performed by the microphone 180) switches from the first position A1 to the second position A2 (see FIGS. 7A and 7B, for example). With such a configuration, the image forming apparatus 1 of one or more embodiments has only one microphone 180, and can switch the position of the microphone 180 from the first position A1 to the second position A2. Accordingly, the image forming apparatus 1 of one or more embodiments can have a smaller number of components than that in an image forming apparatus that has a plurality of microphones.

(5) By displaying a prompting image 190, the switcher 208 can cause the user to switch the position of the microphone 180 from the first position A1 to the second position A2. Accordingly, in the image forming apparatus of one or more embodiments, the load of a process of "switching the position of the microphone 180 from the first position A1 to the second position A2" can be made smaller than that in "an image forming apparatus that switches the position of the microphone 180 from the first position A1 to the second position A2".

(6) Further, as shown in step S2 in FIG. 16, if the voice receiving unit 202 has detected a voice (YES in step S2), the switcher 208 performs prompting control (switching control) in step S10. Accordingly, when a user emits a voice, the image forming apparatus 1 performs prompting control (display of a prompting image 190), so that the user can be made to switch the position of the microphone 180 from the first position A1 to the second position A2. Thus, the flow from the emission of a voice from a user to the switching of the position of the microphone 180 can be made smoother.

(7) As described above with reference to step S16 and step S20 in FIG. 16, when the switcher 208 determines that voice detection by the microphone 180 has finished (YES in step S16) in a case where the position of the voice detection being performed by the microphone 180 is the second position A2, the switcher 208 in step S20 drives the movable device (the operation panel device 10 in one or more embodiments), to perform control to switch the position of voice detection to be performed by the microphone 180 from the second position A2 to the first position A1. The first position A1 is a position at which any action (such as an action to set a document on the image forming apparatus 1) to be performed on the image forming apparatus 1 by the user is not hindered. Thus, the image forming apparatus 1 can prevent hindrance to any action to be performed on the image forming apparatus 1 by the user who has finished voice input.

(8) In one or more embodiments, the movable device on which the microphone 180 is disposed is the operation panel device 10. Therefore, an existing device in the image forming apparatus 1 can be the movable device. Accordingly, the image forming apparatus 1 of one or more embodiments can have a smaller number of components than that of an image forming apparatus to which a movable device needs to be newly added.

(9) The switcher 208 displays a prompting image 190 on the operation panel device 10 serving as the movable device (see FIGS. 7A and 7B, for example). Accordingly, in the image forming apparatus 1, the user who has visually recognized the prompting image 190 displayed on the operation panel device 10 is made to drive the operation panel device 10. Thus, the flow from the display of the prompting image 190 on the operation panel device 10 to the driving of the operation panel device 10 by the user can be made smoother.

(10) Further, as shown in FIG. 16 and others, if the executor 107 is not executing a second job (NO in step S4) when a voice is detected by the microphone 180 (YES in step S2), the prohibitor 2060 prohibits the executor 107 from executing a new second job. Thus, the image forming apparatus 1 can prevent execution of a second job from hindering a first job based on a voice from a user. The image forming apparatus 1 can also prevent the noise caused by execution of a second job from lowering the accuracy of recognition of the voice from the user.

(11) The image forming apparatus may also be designed to estimate the position of a noise generation source. However, the amount of computing to be performed by the image forming apparatus adopting such a configuration would be enormous. Therefore, in one or more embodiments, the storage 212 stores, in advance, the associated information described above with reference to FIG. 5. The associated information is information in which job types are associated with positions (second positions) of voice detection being performed by the microphone 180. By referring to the associated information shown in FIG. 5, the switcher 208 determines the destination of the microphone on the basis of the type of the job being executed, and performs switching control. Thus, the image forming apparatus 1 can determine the destination of the microphone, without performing a large amount of computing (a process for estimating the position of the noise generation source).

(12) As described above with reference to FIG. 2, the image forming apparatus 1 can be connected to various kinds of connection apparatuses 520. Further, by referring to the associated information shown in FIG. 5, the switcher 208 determines the destination of the microphone 180 on the basis of the type of the connected connection apparatus 520 as well as the type of the job being executed, and performs switching control. Thus, even if a connection apparatus 520 is connected to the image forming apparatus 1, flexible switching control can be performed.

In the image forming apparatus according to the embodiments described above, the movable device on which the microphone 180 is disposed is the operation panel device 10. In an image forming apparatus according to one or more embodiments, the movable device in which the microphone 180 is disposed is the document holddown device 108.

Figure 17A:
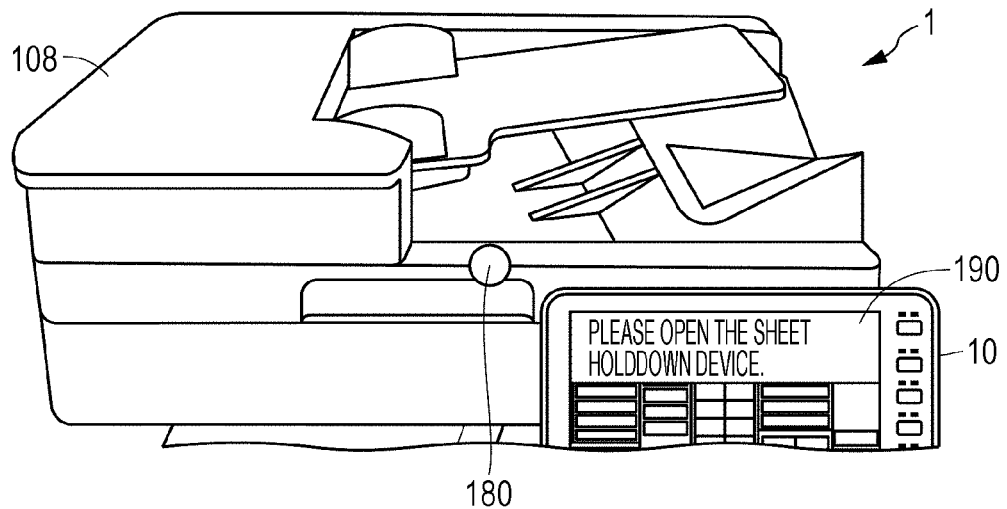
FIGS. 17A and 17B are diagrams illustrating an example of prompting control (part 9) according to one or more embodiments.
Figure 17B:
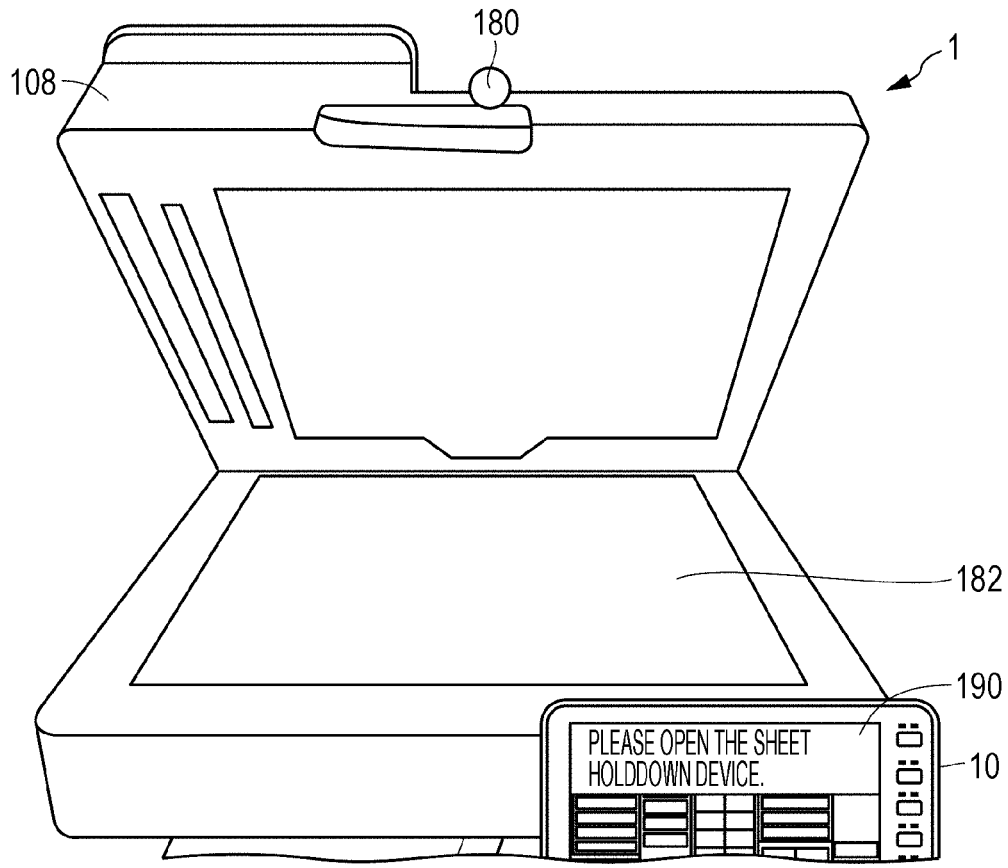

FIGS. 17A and 17B are diagrams illustrating a case where the movable device on which the microphone 180 is disposed is the document holddown device 108, or the microphone 180 is disposed on the document holddown device 108.

FIGS. 17A and 17B illustrate a case where the specifying unit 210 has specified a "position on the upper side (the positive direction in the Z-axis direction) as viewed from the user standing in front of the image forming apparatus" as the position (second position) of the destination of the microphone 180. FIG. 17A shows a case where the document holddown device 108 is in a closed state. FIG. 17A is also a diagram illustrating a case where the microphone 180 is located at the first position. Further, the switcher 208 displays a prompting image 190 reading "Please open the sheet holddown device".

The user who has visually recognized the prompting image 190 opens the document holddown device 108. As the document holddown device 108 is opened, the microphone 180 (or the voice detection position of the microphone 180) is moved to the second position, as shown in FIG. 17B. A state in which the document holddown device 108 is open is a state in which the user can set a document on the placement surface 182.

Figure 18:
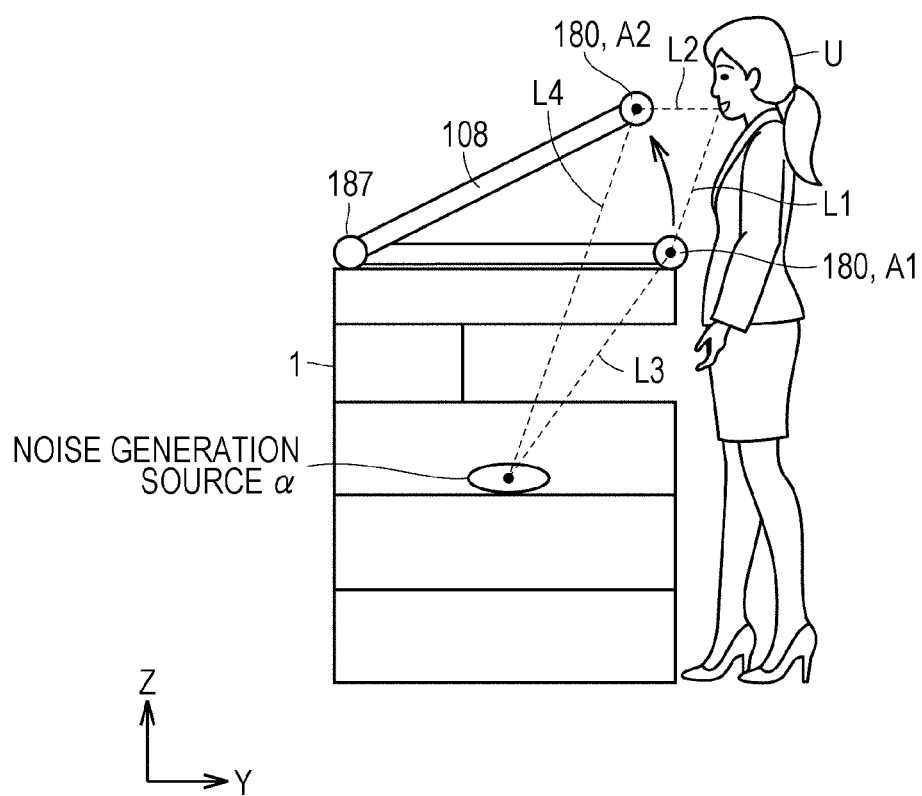
FIG. 18 is a diagram showing the relationship among a microphone, a user, and a noise generation source (part 3) according to one or more embodiments.

FIG. 18 is a diagram showing the distance between the microphone 180 and a user U, and the distance between the microphone 180 and a noise generation source α in one or more embodiments. The document holddown device 108 can be opened and closed about a drive shaft 187. As shown in FIG. 18, when the document holddown device 108 is closed, the position of voice detection to be performed by the microphone 180 switches to the first position A1. When the document holddown device 108 is opened, the position of voice detection to be performed by the microphone 180 switches the second position A2. Accordingly, the distance L1 between the user U (the mouth of the user U) and the microphone 180 (A1) is longer than the distance L2 between the user U (the mouth of the user U) and the microphone 180 (A2). Further, the distance L4 between the noise generation source α and the microphone 180 (A2) is longer than the distance L3 between the noise generation source α and the microphone 180 (A1).

Referring now to the flowchart shown in FIG. 16, a process to be performed by the image forming apparatus of one or more embodiments is described. According to the flowchart of one or more embodiments, a document holddown device is adopted, as indicated in the parentheses in steps S10 and S20 of FIG. 16.

The image forming apparatus of one or more embodiments achieves the same effects as the effects of the image forming apparatus of the aforementioned embodiments. Further, in the image forming apparatus of one or more embodiments, the movable device in which the microphone 180 is disposed is the document holddown device 108. The document holddown device 108 is a component that can be opened and closed (a component that can be driven) as in conventional cases. Thus, the document holddown device 108 can be a movable device that can be driven without any special mechanism installed in the document holddown device 108.

In one or more embodiments, when the document holddown device 108 is closed, the position of voice detection to be performed by the microphone 180 switches to the first position A1, as shown in FIG. 18. When the document holddown device 108 is opened, the position of voice detection to be performed by the microphone 180 switches the second position A2. Thus, it is possible to make the following flow smoother: "the switcher 208 displays a prompting image 190", "the user who has visually recognized the prompting image 190 opens the document holddown device 108", "the user sets a document on the placement surface 182 while the document holddown device 108 is open", and "the user emits a voice while the document holddown device 108 is open (or while the detection position of the microphone 180 is the second position)".

In the embodiments described above, the switching control for switching the position of voice detection to be performed by the microphone is control for prompting the user to drive the movable device (the operation panel device 10 or the document holddown device 108). The switching control of one or more embodiments is control for the image forming apparatus 1 (the switcher 208) to drive the movable device. In one or more embodiments, the switcher 208 includes a drive mechanism (not shown) that can drive the movable device. The drive mechanism includes a gear and a motor, for example.

Figure 19:
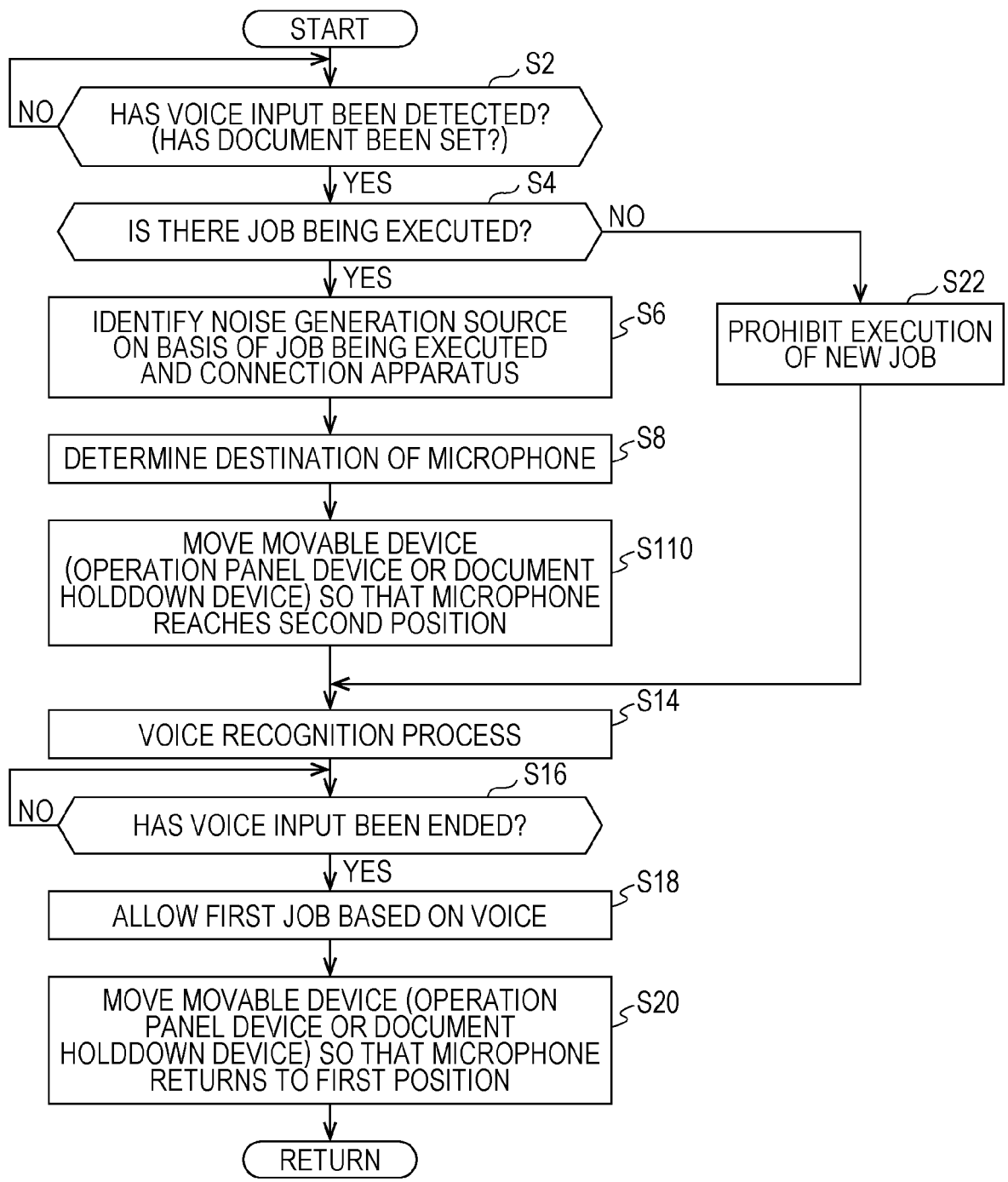
FIG. 19 is a flowchart showing a process to be performed by an image forming apparatus according to one or more embodiments.

FIG. 19 is a flowchart showing a process to be performed by the image forming apparatus 1 of one or more embodiments. FIG. 19 is a flowchart in which step S10 and step S12 in FIG. 16 are replaced with step S110. In step S110, the switcher 208 drives the movable device, so that the position of the microphone 180 (the position of voice detection to be performed by the microphone 180) reaches the second position.

The image forming apparatus 1 of one or more embodiments causes the position of the microphone 180 (the position of voice detection to be performed by the microphone 180) to reach the second position. Thus, the processing load on the user can be reduced.

The idea of one or more embodiments can be applied, regardless of whether the movable device is the operation panel device 10 or the document holddown device 108.

Figure 20:
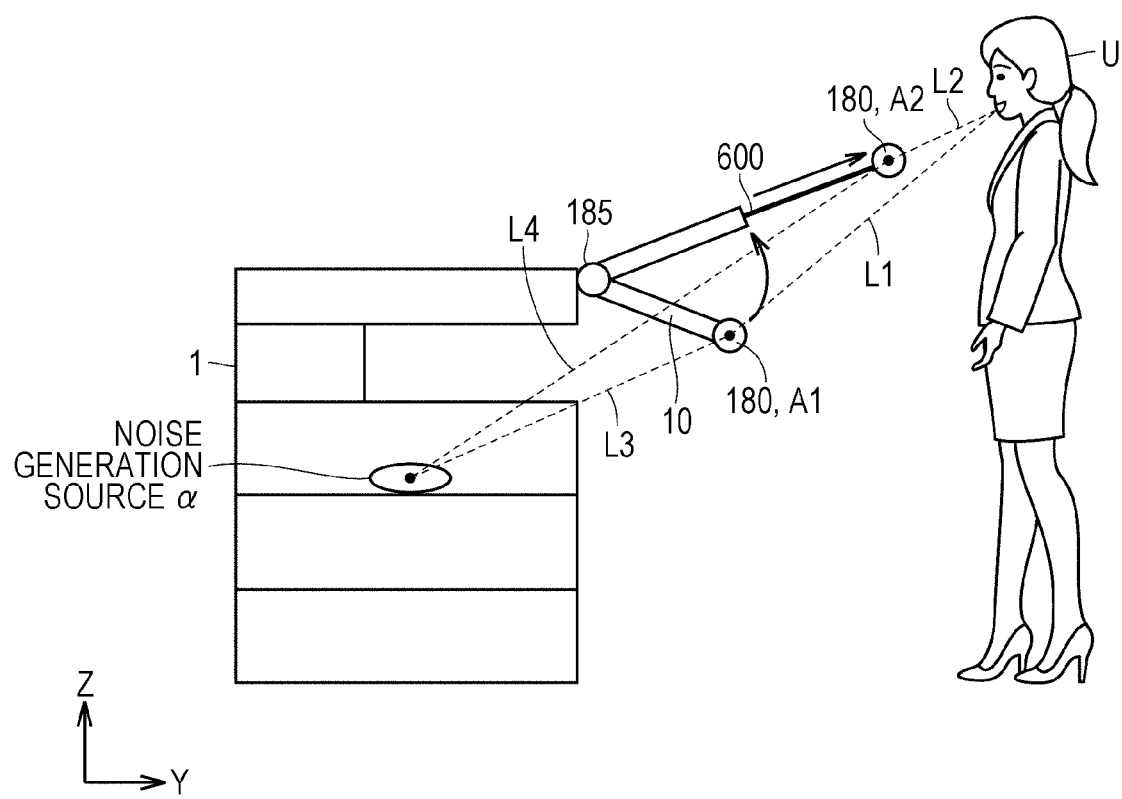
FIG. 20 is a diagram showing the relationship among a microphone, a user, and a noise generation source (part 4) according to one or more embodiments.

A movable portion of one or more embodiments includes a drivable arm. Driving includes expansion/contraction, folding, and moving (protruding from a storage location (the home position)), for example. In one or more embodiments, the arm is a component that can be expanded and contracted. FIG. 20 is a diagram for explaining an image forming apparatus of one or more embodiments in a case where the movable device is the operation panel device 10. As shown in FIG. 20, the movable device has an arm 600 that can be expanded and contracted. As shown in FIG. 20, the switcher 208 drives the operation panel device 10 and extends the arm 600, to switch the position of voice detection to be performed by the microphone 180 from the first position A1 to the second position A2.

Figure 21:
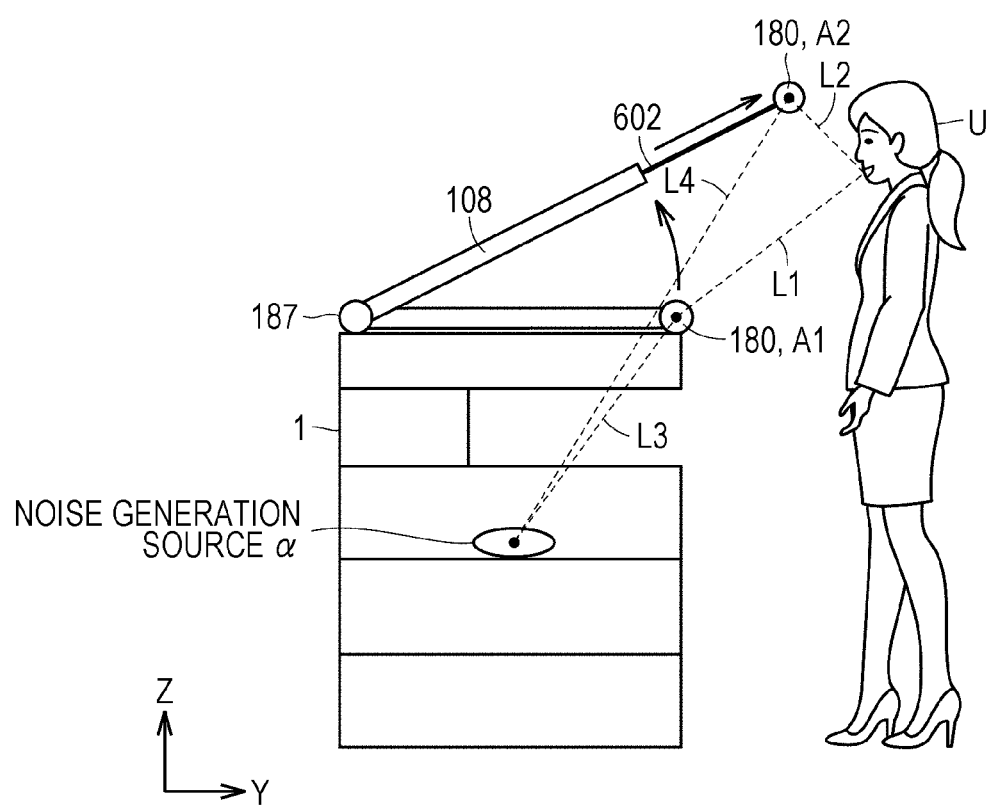
FIG. 21 is a diagram showing the relationship among a microphone, a user, and a noise generation source (part 5) according to one or more embodiments.

FIG. 21 is a diagram for explaining an image forming apparatus of one or more embodiments in a case where the movable device is the document holddown device 108. As shown in FIG. 21, the movable device has an arm 602 that can be expanded and contracted. As shown in FIG. 21, the switcher 208 drives the document holddown device 108 and extends the arm 602, to switch the position of voice detection to be performed by the microphone 180 from the first position A1 to the second position A2.

In the image forming apparatus of one or more embodiments, the movable device is driven, and the arm 602 is also driven (extended), so that the position of voice detection to be performed by the microphone 180 can be switched from the first position A1 to the second position A2. Thus, the microphone 180 can be brought even closer to the user and be moved farther away from the noise generation source α than in an image forming apparatus that drives only the movable device to switch the position of voice detection to be performed by the microphone 180.

Figure 22:
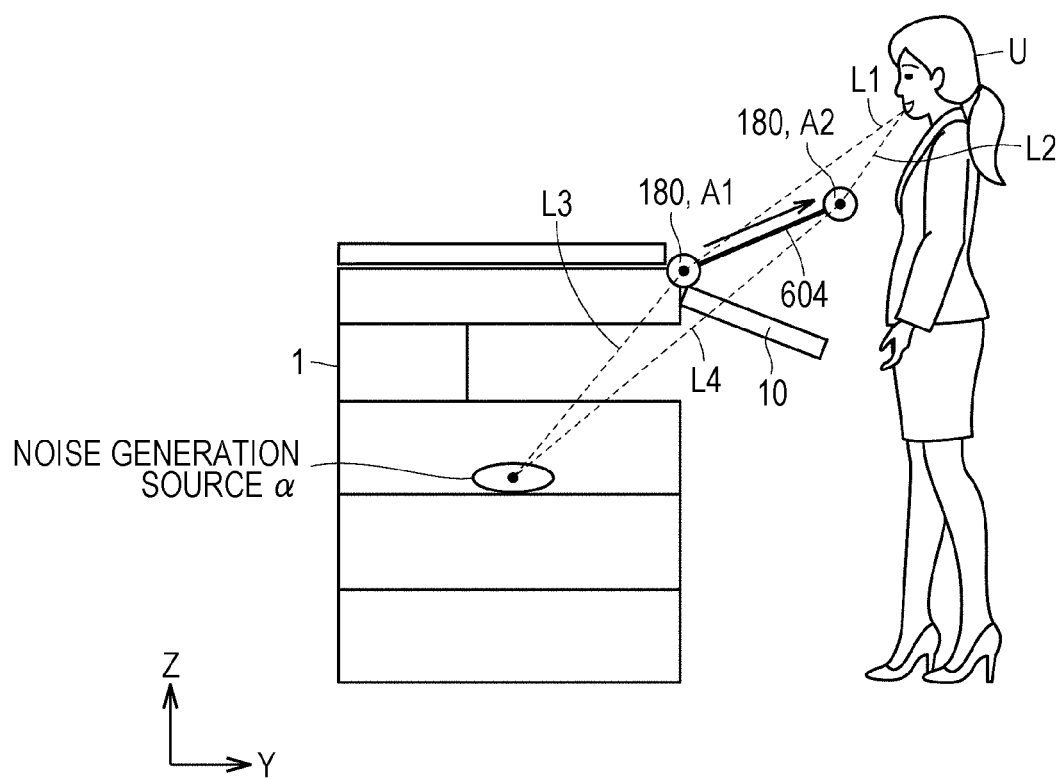
FIG. 22 is a diagram showing the relationship among a microphone, a user, and a noise generation source (part 6) according to one or more embodiments.

In one or more embodiments, the movable device includes an arm 602, but includes neither the operation panel device 10 nor the document holddown device 108. FIG. 22 is a diagram for explaining an image forming apparatus of one or more embodiments. As shown in FIG. 22, the switcher 208 extends the arm 604, to switch the position of voice detection to be performed by the microphone 180 from the first position A1 to the second position A2.

The image forming apparatus of one or more embodiments can switch the position of voice detection to be performed by the microphone 180 from the first position A1 to the second position A2, without any special mechanism that can drive the operation panel device 10, for example.

Figure 23:
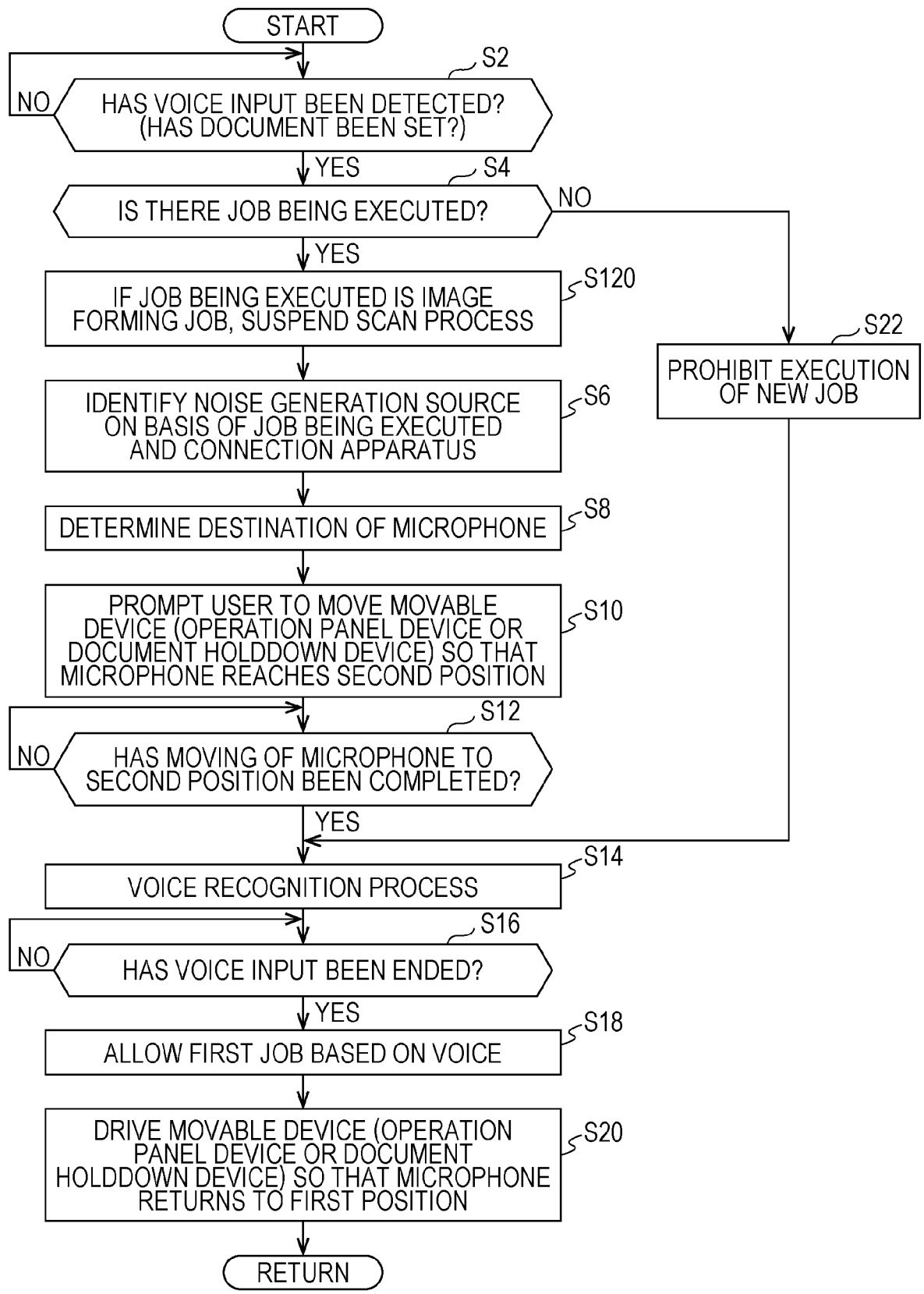
FIG. 23 is a flowchart showing a process to be performed by an image forming apparatus according to a modification of one or more embodiments (part 1)

FIG. 23 is a flowchart showing a process to be performed by an image forming apparatus 1 of one or more embodiments. FIG. 23 is a flowchart in which step S120 is interposed between steps S4 and S6 of the flowchart shown in FIG. 16. In step S120, the execution control unit 206 determines whether the job being executed in step S4 is an image forming job. The image forming job includes a scan process for scanning an image (such as an image of a set document), and a print process for printing the scanned image on a paper sheet. The print process to be performed on the image data indicating the scanned image includes a process of electrically charging a photosensitive member, a process of exposing the photosensitive member, a process of developing a toner image on the photosensitive member, and a process of transferring the toner image onto a paper sheet. The print process includes a larger number of processing steps than the scan process. Accordingly, the time required to complete the scan process is shorter than the time required to complete the print process.

Therefore, in step S120, the execution control unit 206 suspends the scan process but continues the print process being performed in the image forming job being executed. Further, at a predetermined timing after the determination results becomes YES in step S16, for example, the execution control unit 206 resumes the suspended scan process.

With the image forming apparatus 1 of one or more embodiments, noise generation due to a scan process can be stopped during a voice input (during the process in step S14, for example). Thus, the image forming apparatus 1 of one or more embodiments can make the noise level lower than the noise level at a time when both the print process and the scan process are being performed.

Further, the time required to complete the scan process is shorter than the time required to complete the print process. Thus, the image forming apparatus of one or more embodiments that suspends the scan process can make the decrease in the productivity of the image forming job smaller than that with an image forming apparatus that suspends the print job.

Figure 24:
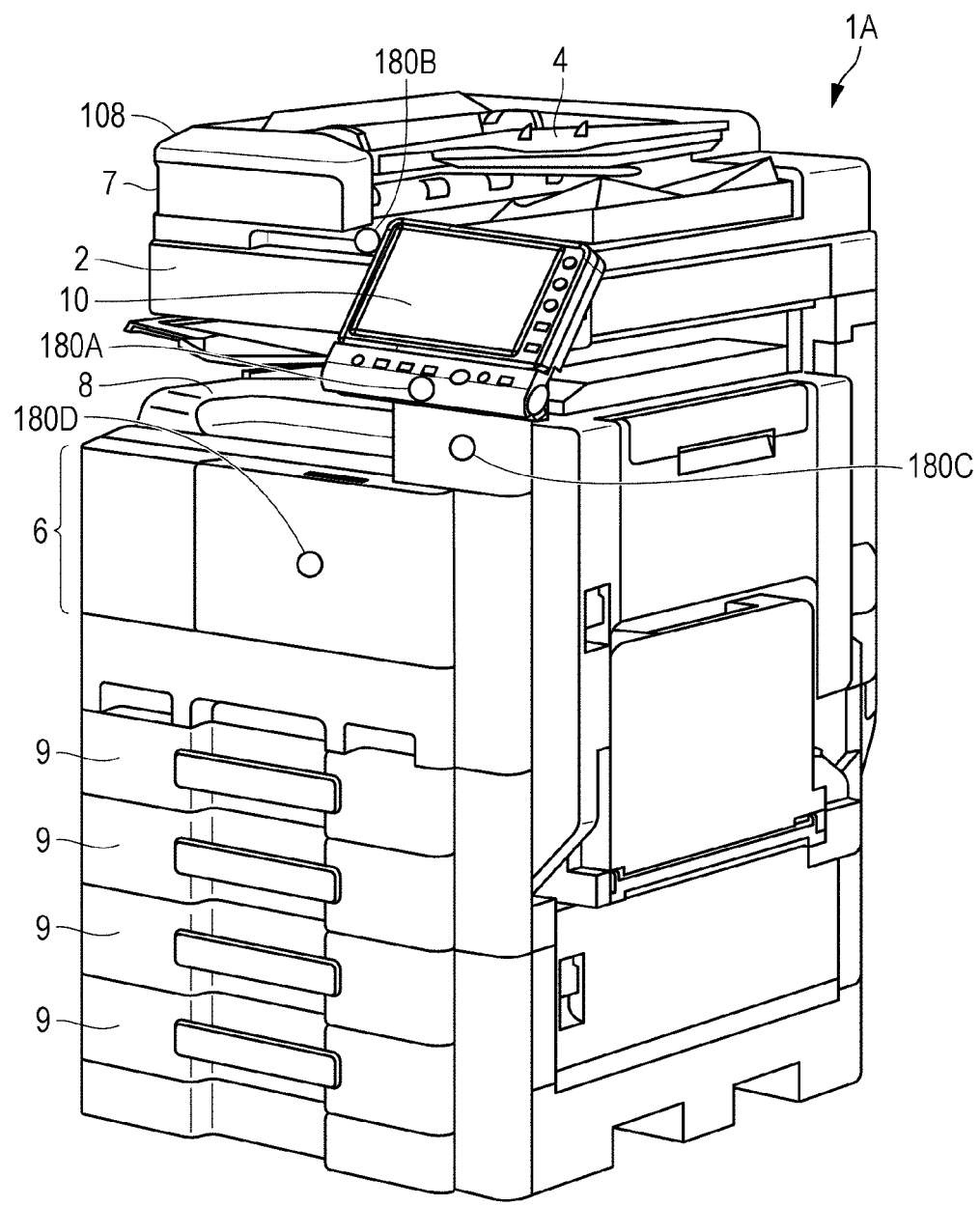
FIG. 24 is a diagram showing the configuration of an entire image forming apparatus according to a modification of one or more embodiments.

The embodiments described above involve only one microphone 180. An image forming apparatus of one or more embodiments includes a plurality of microphones. FIG. 24 is a diagram showing the configuration of an entire image forming apparatus 1A of one or more embodiments. The image forming apparatus 1A includes four microphones as the plurality of microphones, which are a microphone 180A, a microphone 180B, a microphone 180C, and a microphone 180D. In one or more embodiments, the default microphone (the microphone 180A, for example) among the four microphones is defined as the microphone for voice recognition. The position of voice detection to be performed by the default microphone corresponds to the "first position".

The image forming apparatus 1A of one or more embodiments can perform voice recognition with any of the four microphones.

Figure 25:
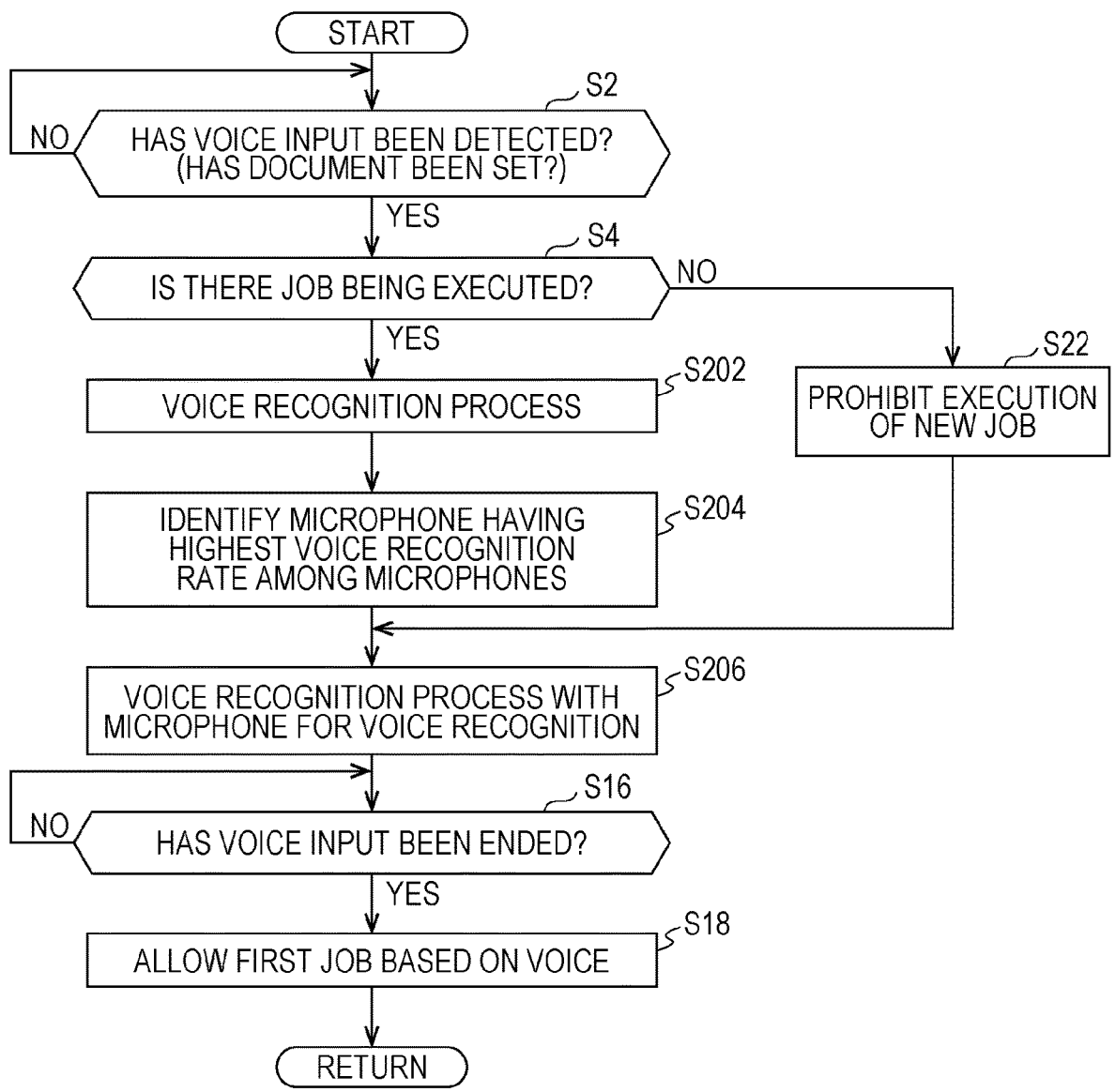
FIG. 25 is a flowchart showing a process to be performed by an image forming apparatus according to a modification of one or more embodiments (part 2).

FIG. 25 is a flowchart showing the flow in a process to be performed by the image forming apparatus 1A of one or more embodiments. If the result of determination in step S4 is NO, the voice receiving unit 202 in step S202 starts a voice recognition process for each of the voices that have been input from the four microphones. The voice receiving unit 202 performs the voice recognition process over a certain period T.

In step S204, on the basis of the results of the voice recognition process performed on each of the voices input from the four microphones, the voice receiving unit 202 identifies the microphone showing the highest rate of recognition of the input voice.

Here, a voice recognition rate is the value obtained by dividing the period during which a voice is correctly recognized by the certain period T, for example. For example, noise is mixed in a voice that has been input to a microphone located close to the source of the noise generation caused by the job being executed, and therefore, the period during which the voice is correctly recognized is short. Accordingly, the rate of recognition of the voice that has been input to the microphone located close the source of the noise generation is low.

On the other hand, noise is not mixed or is hardly mixed in a voice that has been input to a microphone located far from the source of the noise generation caused by the job being executed, and therefore, the period during which the voice is correctly recognized is long. Accordingly, the rate of recognition of the voice that has been input to the microphone located far from the source of the noise generation is high.

Alternatively, a voice recognition rate may indicate some other aspect. For example, a voice recognition rate may be a voice level, for example.

In this manner, the switcher 208 switches the microphone for voice recognition from the default microphone to the microphone showing the highest voice recognition rate in step S204. As described above, in one or more embodiments, the switcher 208 performs control for switching the detection position of the microphone (the microphone for voice recognition), depending on the job being executed. The position of voice detection to be performed by the microphone for voice recognition switched by the switcher 208 corresponds to the "second position".

Alternatively, the specifying unit 210 may identify the source of the noise generation caused by execution of a job, and the switcher 208 may switch the microphone for voice recognition (the detection position of the microphone) to the microphone located at the farthest position from the identified source of the noise generation.

In step S206, the voice receiving unit 202 performs a voice recognition process on the voice that has been input to the microphone (the microphone for voice recognition) switched by the switcher 208. If the result of determination in step S4 is NO, however, the process in step S204 is not performed. Therefore, in step S206, the voice receiving unit 202 performs a voice recognition process on the voice that has been input through the default microphone.

The image forming apparatus 1A of one or more embodiments includes a plurality of microphones (a plurality of voice detection positions), and switches the position of voice detection to be performed by a microphone, depending on the job being executed, for example. Thus, the image forming apparatus 1A of one or more embodiments achieves the same effects as those of the foregoing embodiments. Furthermore, since the image forming apparatus 1A of one or more embodiments does not include any movable device equipped with a microphone, the process of causing the user to drive the movable device, and the process to be performed by the image forming apparatus to drive the movable device can be eliminated.

[Modifications]

(1) In the embodiments described so far, the switcher 208 performs the switching control for switching the position of voice detection to be performed by a microphone 180, depending on the "job being executed". However, the switcher 208 may perform the switching control, depending on a "job determined to be executed in the future", instead of the "job being executed". The "job determined to be executed in the future" is a pending job held in the image forming apparatus 1.

In such a case, in step S6 in FIG. 16, the specifying unit 210 identifies the noise generation source, on the basis of "the pending job and the job being executed" and the connection apparatus, for example. In an image forming apparatus adopting such a configuration, even if a job that was not being executed at the time of the start of emission of a voice from the user is started in the middle of the emission of the voice, the position of voice detection to be performed by the microphone 180 has been switched to the second position, and thus, the voice receiving unit 202 can perform a correct voice recognition process.

(2) In the embodiments described above, the distance L1 between the user U (the mouth of the user U) and the microphone 180 (A1) located at the first position is longer than the distance L2 between the user U (the mouth of the user U) and the microphone 180 (A2) located at the second position, and the distance L3 between the noise generation source α and the microphone 180 (A1) is shorter than the distance L4 between the noise generation source α and the microphone 180 (A2), as shown in FIG. 14 and others.

However, while L1>L2, L3>L4 may be satisfied. Specifically, while the second position is a position at which the distance to the user is shorter than that at the first position, the second position may be a position at which the distance to the source of the noise generation caused a job is the same as that at the first position, or may be a position at which the distance to the source of the noise generation caused a job is shorter than that at the first position.

Further, while L1<L2, L3<L4 may be satisfied. Specifically, while the second position is a position at which the distance to the user is longer than that at the first position, or is a position at which the distance to the user is the same as that at the first position, the second position may be a position at which the distance to the source of the noise generation caused a job is longer than that at the first position.

(3) In the embodiments described above, in a case where a voice from the user has been detected by the voice receiving unit 202 (a microphone 180) as described above with reference to step S2 in FIG. 16 and others, the processes in step S4 and the steps that follow are performed. In other words, in the embodiments described above, the trigger for execution of the switching control in step S10 is detection of a user's voice by the voice receiving unit 202 (a microphone 180). However, the trigger for execution may be some other trigger. For example, as indicated in the parentheses in step S2 in FIGS. 16, 19, 23, and 25, some other trigger may be setting of a document on the image forming apparatus (placement of a document on the placement surface 182) (see the description in the parentheses in step S2 in FIGS. 16, 19, 23 and 25).

When a user who is about to input a voice to a microphone 180 of an image forming apparatus sets a document on the image forming apparatus, the user has the intention to cause the image forming apparatus to perform processing based on the document through voice recognition.

Accordingly, the image forming apparatus of a modification of one or more embodiments can regard "setting of a document on the image forming apparatus" as the trigger for execution of the switching control. Thus, the image forming apparatus of the modification can smoothly form the flow in which "the user sets a document", "the microphone 180 reaches the second position", and "the user emits a voice".

Alternatively, the trigger for execution of the switching control may be "setting of a document, and detection of a user's voice by the voice receiving unit 202 (a microphone 180)", for example.

(4) The image forming apparatus 1 may further include a human-presence sensor that detects the position of a user. The switcher 208 may switch the detection position of the microphone 180 so that the detection position of the microphone 180 approaches the human (user) detected by the human-presence sensor.

(5) Further, after switching the position of voice detection to be performed by a microphone 180, an image forming apparatus may display, in a predetermined display region (such as the display region on the operation panel device 10), the level of the noise caused by the job being executed by the image forming apparatus, and the threshold level at which voice recognition can be correctly performed (or the threshold level at which a voice recognition process is allowed). For example, in a case where the level of the noise is higher than the threshold level, there is a high possibility that a voice recognition process will not be correctly performed. Therefore, the image forming apparatus of the modification can prompt the user who has visually recognized the level of the noise and the threshold level, to move the microphone 180.

(6) In the embodiments described above, the specifying unit 210 identifies the position of the noise generation source in step S6 in FIG. 16 and others. However, the specifying unit 210 may specify the destination of the microphone 180 in step S8, without carrying out step S6 in FIG. 16 and others.

(7) In FIG. 16 and others, an image forming apparatus performs the process in step S18 before performing the process in step S20. However, an image forming apparatus may adopt a configuration in which the image forming apparatus performs the process in step S18 after performing the process in step S20.

Further, at least part of the technical matter described in the above embodiments and modifications may be applied to other embodiments or other modifications, for example.

Although the embodiments of the present invention have been described and illustrated in detail, the disclosed embodiments are made for purposes of illustration and example only and not limitation. The scope of the present invention should be interpreted by terms of the appended claims, and it should be understood that equivalents of the claimed inventions and all modifications thereof are incorporated herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus that executes a job, comprising:
    a microphone that detects a voice; and
    a hardware processor that controls switching of a position of voice detection by the microphone based on the job, wherein
    the image forming apparatus executes:
        a first job based on the voice detected by the microphone; and
        a second job different from the first job, and
    the hardware processor prohibits the image forming apparatus from executing the second job, on condition that the image forming apparatus is not executing the second job at the time when the microphone detects the voice.

2. The image forming apparatus according to claim 1, wherein
    the position of voice detection includes:
        a first position; and
        a second position, wherein
        a distance from the second position to a source of noise generated by the job is longer than a distance from the first position to the source of noise.

3. The image forming apparatus according to claim 1, wherein
    the position of voice detection includes:
        a first position; and
        a second position, wherein
        a distance from the second position to a user is shorter than a distance from the first position to the user.

4. The image forming apparatus according to claim 2, further comprising:
    a movable device on which the microphone is disposed, wherein
    when the movable device is driven, the position of voice detection is switched from the first position to the second position.

5. The image forming apparatus according to claim 4, wherein
    the hardware processor controls the switching by driving the movable device.

6. The image forming apparatus according to claim 4, wherein
    the hardware processor controls the switching by prompting a user to drive the movable device.

7. The image forming apparatus according to claim 5, wherein
    when the microphone detects the voice, the hardware processor is triggered to control the switching.

8. The image forming apparatus according to claim 5, wherein
    when a document is set on the image forming apparatus, the hardware processor is triggered to control the switching.

9. The image forming apparatus according to claim 4, wherein
    upon determining that the position of voice detection is the second position, the hardware processor drives the movable device to switch the position of voice detection from the second position to the first position.

10. The image forming apparatus according to claim 4, wherein
    the movable device comprises a document holddown device that holds down a document.

11. The image forming apparatus according to claim 10, wherein
    when the document holddown device is closed, the position of voice detection is switched to the first position, and
    when the document holddown device is opened, the position of voice detection is switched to the second position.

12. The image forming apparatus according to claim 4, wherein
    the movable device comprises a display that displays information.

13. The image forming apparatus according to claim 4, wherein
    the movable device comprises an arm, and
    when the arm is driven, the position of voice detection is switched from the first position to the second position.

14. The image forming apparatus according to claim 4, wherein
    the movable device comprises:
        an arm; and
        one of either a display that displays information and a document holddown device that holds down a document, wherein
    when the arm and the one of the display and the document holddown device are both driven, the position of voice detection is switched from the first position to the second position.

15. The image forming apparatus according to claim 1, wherein
    the image forming apparatus connects to a connection apparatus, and
    the hardware processor controls the switching based on a type of the connection apparatus.

16. The image forming apparatus according to claim 1, wherein
    the hardware processor:
        stores associated information that includes a type of job associated with the position of voice detection, and
        controls the switching by referring to the associated information.

17. An image forming apparatus that executes a job, comprising:
    a microphone that detects a voice; and
    a hardware processor that controls switching of a position of voice detection by the microphone based on the job, wherein
    the job includes an image forming job,
    the image forming job includes:
        scanning an image; and
        printing the scanned image on a recording medium, and
    when the microphone detects the voice during execution of the image forming job, the image forming apparatus suspends the scanning and continues the printing.

18. A method of controlling an image forming apparatus that comprises a microphone that detects a voice, the method comprising:
    controlling switching of a position of voice detection by the microphone, depending on a job, wherein
    the image forming apparatus executes:
        a first job based on the voice detected by the microphone; and
        a second job different from the first job, and
    the method further comprising:

prohibiting the image forming apparatus from executing the second job, on condition that the image forming apparatus is not executing the second job at the time when the microphone detects the voice.

19. A non-transitory recording medium storing a computer readable program for controlling an image forming apparatus, the program causing a computer to execute:

controlling switching of a position of voice detection by a microphone, depending on a job, wherein the image forming apparatus executes:
- a first job based on the voice detected by the microphone; and
- a second job different from the first job, and the program further causes the computer to execute:
- prohibit the image forming apparatus from executing the second job, on condition that the image forming apparatus is not executing the second job at the time when the microphone detects the voice.

\* \* \* \* \*